United States Patent
Wang et al.

(10) Patent No.: US 9,811,923 B2
(45) Date of Patent: Nov. 7, 2017

(54) STOCHASTIC TEMPORAL DITHERING FOR COLOR DISPLAY DEVICES

(71) Applicant: Snap Track, Inc., San Diego, CA (US)

(72) Inventors: Shen-Ge Wang, Santa Clara, CA (US); Jian Jim Ma, San Diego, CA (US); Songhe Cai, San Diego, CA (US); Marek Mienko, San Jose, CA (US); Bing Wen, Poway, CA (US)

(73) Assignee: SnapTrack, Inc., San Diego, CA (US)

( * ) Notice: Subject to any disclaimer, the term of this patent is extended or adjusted under 35 U.S.C. 154(b) by 111 days.

(21) Appl. No.: 14/864,528

(22) Filed: Sep. 24, 2015

(65) Prior Publication Data

US 2017/0091960 A1    Mar. 30, 2017

(51) Int. Cl.
  *G06T 11/00*    (2006.01)
  *G06T 1/20*    (2006.01)
(52) U.S. Cl.
  CPC .............. *G06T 11/001* (2013.01); *G06T 1/20* (2013.01); *G06T 2200/28* (2013.01)
(58) Field of Classification Search
  CPC ................... G06T 3/0087; G06T 7/277; G06T 2207/20182; H04N 7/152; H04N 7/155; H04N 19/107
  See application file for complete search history.

(56) References Cited

U.S. PATENT DOCUMENTS

| | | | |
|---|---|---|---|
| 5,111,310 A | 5/1992 | Parker et al. | |
| 5,673,121 A | 9/1997 | Wang | |
| 5,740,279 A | 4/1998 | Wang et al. | |
| 5,787,238 A | 7/1998 | Wang | |
| 5,818,405 A | 10/1998 | Eglit et al. | |
| 5,859,955 A | 1/1999 | Wang | |
| 5,978,556 A | 11/1999 | Wang | |
| 6,014,500 A | 1/2000 | Wang | |
| 6,363,172 B1 | 3/2002 | Cheung et al. | |
| 6,384,836 B1 | 5/2002 | Naylor, Jr. et al. | |
| 6,394,612 B1 | 5/2002 | Yano | |
| 6,717,696 B1 | 4/2004 | Wang et al. | |
| 6,798,539 B1 | 9/2004 | Wang et al. | |
| 6,844,941 B1 | 1/2005 | Sharma et al. | |
| 6,985,256 B2 | 1/2006 | Cheng et al. | |
| 6,985,262 B2 | 1/2006 | Wang | |
| 7,081,901 B1 | 7/2006 | Ludden et al. | |

(Continued)

OTHER PUBLICATIONS

"Blue Noise Mask: Premier Stochastic Imaging Technology" Downloaded from http:/WWW.rctech.com on Oct. 14, 2013.

(Continued)

*Primary Examiner* — Antonio A Caschera
(74) *Attorney, Agent, or Firm* — Knobbe, Martens, Olson & Bear, LLP

(57) ABSTRACT

Systems, methods and apparatus, including computer programs encoded on computer storage media, for displaying high bit-depth images using spatial vector screening and/or temporal dithering on display devices including display elements that have multiple primary colors. The systems, methods and apparatus described herein are configured to assign one of the primary colors to a display element of the display device that corresponds to the image pixel based on a rank order and a partition index of an associated screen element of a stochastic screen associated with the display device or a portion thereof.

25 Claims, 14 Drawing Sheets

(56) References Cited

U.S. PATENT DOCUMENTS

| | | |
|---|---|---|
| 7,286,146 B2 | 10/2007 | Goldschmidt et al. |
| 7,330,193 B2 | 2/2008 | Bhattacharjya |
| 7,480,076 B2 | 1/2009 | Wang |
| 7,483,043 B2 | 1/2009 | Morgan et al. |
| 7,675,651 B2 | 3/2010 | Wang et al. |
| 7,679,787 B2 | 3/2010 | Wang et al. |
| 7,719,722 B2 | 5/2010 | Sharma et al. |
| 7,826,095 B2 | 11/2010 | Wang et al. |
| 7,889,390 B2 | 2/2011 | Wang |
| 7,898,692 B2 | 3/2011 | Wang et al. |
| 7,933,044 B2 | 4/2011 | Wang |
| 8,077,357 B2 | 12/2011 | Bernal et al. |
| 8,077,907 B2 | 12/2011 | Wang |
| 8,098,404 B2 | 1/2012 | Bernal et al. |
| 8,098,880 B2 | 1/2012 | Wang |
| 8,305,391 B2 | 11/2012 | Ramanath et al. |
| 8,351,085 B2 | 1/2013 | Wang et al. |
| 8,451,298 B2 | 5/2013 | Silverstein et al. |
| 8,467,103 B2 | 6/2013 | Wang et al. |
| 8,482,803 B2 | 7/2013 | Wang et al. |
| 8,547,614 B2 | 10/2013 | Wang et al. |
| 8,576,451 B2 | 11/2013 | Wang et al. |
| 8,754,903 B2 | 6/2014 | Kim et al. |
| 2007/0008335 A1 | 1/2007 | Bhattacharjya |
| 2009/0201318 A1 | 8/2009 | Silverstein et al. |
| 2009/0251483 A1 | 10/2009 | Hsu et al. |
| 2013/0271356 A1 | 10/2013 | Yoshida et al. |
| 2014/0192079 A1 | 7/2014 | Lee et al. |
| 2015/0109355 A1 | 4/2015 | Wang et al. |
| 2015/0379734 A1* | 12/2015 | Golas .................. G06T 1/60 345/597 |

OTHER PUBLICATIONS

International Search Report and Written Opinion—PCT/US2016/052514—ISA/EPO—dated Feb. 27, 2017.

"Color Difference", https://en.wikipedia.org/wiki/Color_difference, downloaded from the Internet on Jul. 14, 2017.

\* cited by examiner

Common Voltages

|  | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

Segment Voltages

1105

| 90 | 45 | 20 | 100| 47 | 52 | 11 | 72 | 20 | 60 | 8  | 68 | 0  | 63 |
|----|----|----|----|----|----|----|----|----|----|----|----|----|----|
| 53 | 6  | 75 | 34 | 79 | 25 | 91 | 38 | 81 | 43 | 84 | 39 | 95 | 32 |
| 86 | 67 | 26 | 58 | 1  | 69 | 18 | 57 | 4  | 67 | 13 | 55 | 18 | 72 |
| 51 | 17 | 94 | 42 | 85 | 36 | 96 | 45 | 88 | 24 | 75 | 29 | 90 | 42 |
| 30 | 80 | 8  | 62 | 14 | 54 | 6  | 64 | 15 | 49 | 99 | 51 | 4  | 61 |
| 65 | 44 | 71 | 32 | 78 | 27 | 93 | 39 | 73 | 31 | 59 | 26 | 81 | 36 |
| 27 | 98 | 23 | 89 | 47 | 74 | 22 | 82 | 11 | 86 | 1  | 77 | 21 | 67 |
| 54 | 10 | 61 | 3  | 55 | 7  | 66 | 44 | 56 | 34 | 70 | 46 | 94 | 40 |
| 47 | 87 | 36 | 83 | 40 | 99 | 29 | 90 | 20 | 97 | 9  | 54 | 17 | 62 |
| 72 | 21 | 68 | 16 | 59 | 12 | 70 | 2  | 60 | 38 | 80 | 25 | 88 | 33 |
| 42 | 77 | 31 | 92 | 46 | 78 | 33 | 50 | 84 | 14 | 64 | 43 | 71 | 1  |
| 97 | 10 | 53 | 4  | 65 | 19 | 95 | 24 | 73 | 29 | 92 | 5  | 57 | 98 |
| 23 | 80 | 26 | 88 | 36 | 82 | 43 | 63 | 8  | 54 | 47 | 78 | 22 | 40 |
| 39 | 61 | 44 | 70 | 15 | 56 | 10 | 86 | 39 | 98 | 18 | 35 | 89 | 50 |

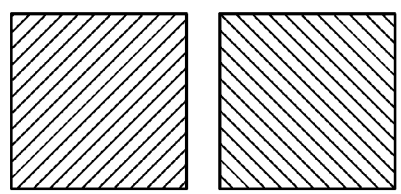
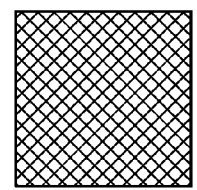
FIG. 13A  FIG. 13B
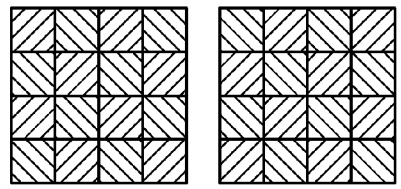
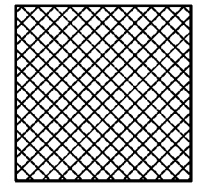
FIG. 13C  FIG. 13D
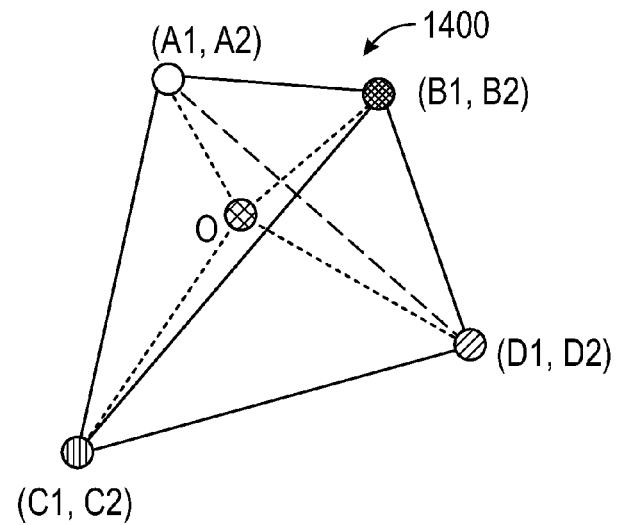
FIG. 14
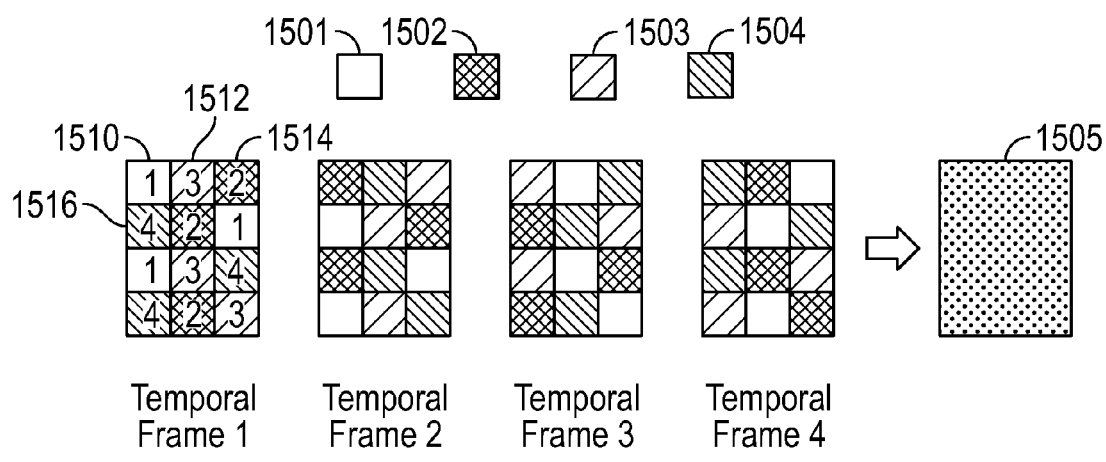
FIG. 15

FIG. 16

STOCHASTIC TEMPORAL DITHERING FOR COLOR DISPLAY DEVICES

TECHNICAL FIELD

This disclosure relates to methods and systems for displaying an input image on a display device with reduced flicker.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

Some display devices, such as, for example EMS systems based display devices, can produce an input color by utilizing more than three primary colors. Each of the primary colors can have reflectance or transmittance characteristics that are independent of each other. Such devices can be referred to as multi-primary display devices. In multi-primary display devices there may be more than one combination of the multiple primary colors to produce the same color having input color values, such as red (R), green (G), and blue (B) values.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus comprising a display device including a plurality of display elements. Each display element is capable of displaying N primary colors in a color space associated with the display device. The apparatus includes a computing device capable of communicating with the display device. The computing device is capable of processing image data that includes a plurality of input colors for display by the display device. The image data also includes a plurality of image pixels with each image pixel associated with an input image pixel color. For a given image pixel, the computing device is capable of identifying, from a color palette including colors capable of being displayed by temporal dithering of the N primary colors in K number of temporal sub-frames, L number of colors that can be combined by spatio-temporal dithering to produce a color that is perceptually similar to the input image pixel color.

For the given image pixel, the computing device is further capable of associating a stochastic screen with the display device or a portion thereof. The stochastic screen includes a plurality of screen elements belonging to one of M number of partitions. Each of the plurality of screen elements is associated with a corresponding display element of the display device. For each of the K number of temporal sub-frames, the computing device is capable of assigning one of the L number of colors to a display element of the display device that corresponds to the image pixel. The assignment of one of the L number of colors to the display element in each of the K number of temporal sub-frames is based on a rank order and a partition index of a screen element of the stochastic screen that is associated with the display element. Without any loss of generality, the number of colors, L, that can be combined by spatio-temporal dithering to produce a color that is perceptually similar to the input image pixel color can be equal to the number of partitions, M, of the stochastic screen.

The stochastic screen is configured such that visual appearance of the image produced by each of the K number of temporal sub-frames is similar to an image produced by combining the K number of temporal sub-frames. In various implementations, the stochastic screen can include at least 256 screen elements. The stochastic screen can include a plurality of partitions P(i) and the screen element can belong to one of the plurality of partitions P(i). In various implementations, the number of the plurality of partitions, M can be equal to the number of temporal sub-frames, K. In various implementations, the number of the plurality of partitions, M can be greater than the number of temporal sub-frames, K. In various implementations, the plurality of partitions can be equal in size. The plurality of partitions can be mutually exclusive. Each of the plurality of partitions can include an equal number of screen elements. A difference in the rank order of two successive screen elements in one of the plurality of partitions can be equal to a total number of the plurality of partitions.

The stochastic screen can be determined by a merit function $Q_{sum}$ given by an equation $Q_{sum} = Q_{\Sigma P(i)} + w * \Sigma_{i=1}^{M} Q_{P(i)}$, wherein w is a weighting factor for balancing dithered image quality for each of the plurality of partitions P(i), M is the number of partitions, $Q_{P(i)}$ is a merit function that determines a stochastic screen which when applied to display elements in the partition P(i) generates an image to be displayed in the $i^{th}$ temporal sub-frame and $Q_{\Sigma P(i)}$ is a merit function that determines a stochastic screen that generates the entire temporally dithered image. The stochastic screen can be configured to reduce a contrast difference between consecutive temporal sub-frames. The stochastic screen can be configured to distribute a color difference between images produced by each of the temporal sub-frames to spatial high frequency regions. The apparatus can include a non-transitory memory device that is capable of communicating with the computing device. The non-transitory memory device can be configured to store a look-up table. The look-up table can store a correspondence between the display color and the set of primary colors, a rank order and/or a partition index for various screen elements and other variables and parameters associated with the stochastic screen.

In various implementations, the display device can be a reflective display device. At least some of the plurality of display elements can include a movable mirror. Each of the N primary colors can correspond to a distinct position of the movable mirror.

Another innovative aspect of the subject matter described in this disclosure is a computer-implemented method to display image data on a display device including a plurality of display elements. Each display element is capable of displaying N primary colors in a color space associated with the display device. The image data includes a plurality of input colors for display by the display device. The image data includes a plurality of image pixels with each image pixel associated with an input image pixel color. The method is performed under control of a hardware computing device associated with the display device.

For a given image pixel, the method comprises identifying, from a color palette including colors capable of being displayed by temporal dithering of the N primary colors in K number of temporal sub-frames, L number of colors that can be combined by spatio-temporal dithering to produce a color that is perceptually similar to the input image pixel color. The method further includes associating a stochastic screen with the display device or a portion thereof. The stochastic screen includes a plurality of screen elements belonging to one of M number of partitions. Each of the plurality of screen elements is associated with a corresponding display element of the display device. For each of the K number of temporal sub-frames, the method further comprises, assigning one of the L number of colors to a display element of the display device that corresponds to the image pixel. The assignment of one of the L number of colors to the display element in each of the K number of temporal sub-frames is based on a rank order and a partition index of a screen element of the stochastic screen that is associated with the display element. The stochastic screen is configured such that visual appearance of the image produced by each of the K number of temporal sub-frames is similar to an image produced by combining the K number of temporal sub-frames.

Another innovative aspect of the subject matter described in this disclosure is a non-transitory computer storage medium comprising instructions that when executed by a processor cause the processor to perform a method for displaying image data on a display device including a plurality of display elements. Each display element is capable of displaying N primary colors in a color space associated with the display device. The image data includes a plurality of input colors for display by the display device. The image data includes a plurality of image pixels with each image pixel associated with an input image pixel color. For a given image pixel, the method comprises identifying, from a color palette including colors capable of being displayed by temporal dithering of the N primary colors in K number of temporal sub-frames, L number of colors that can be combined by spatio-temporal dithering to produce a color that is perceptually similar to the input image pixel color. The method further comprises associating a stochastic screen with the display device or a portion thereof, the stochastic screen includes a plurality of screen elements belonging to one of M number of partitions. Each of the plurality of screen elements is associated with a corresponding display element of the display device. For each of the K number of temporal sub-frames, the method comprises assigning one of the L number of colors to a display element of the display device that corresponds to the image pixel. The assignment of one of the L number of colors to the display element in each of the K number of temporal sub-frames is based on a rank order and a partition index of a screen element of the stochastic screen that is associated with the display element. The stochastic screen is configured such that visual appearance of the image produced by each of the K number of temporal sub-frames is similar to an image produced by combining the K number of temporal sub-frames.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

FIGS. 13A-13D illustrate examples of temporally blending two different primary colors to generate a blended color.

FIG. 14 illustrates an example of representing an input color (O) by blending eight different primary colors associated with a multi-primary display device using vector screening method combined with temporal dithering.

FIG. 15 illustrates an example of rendering the same display color using a temporal dithering with stochastic screening method in which a spatial arrangement of the four primary colors is determined using a single stochastic screen.

FIG. 16 illustrates an implementation of a 256-element stochastic screen that can be used to partition the display surface into four partitions.

Like reference numbers and designations in the various drawings indicate like elements.

DETAILED DESCRIPTION

Figure 1:
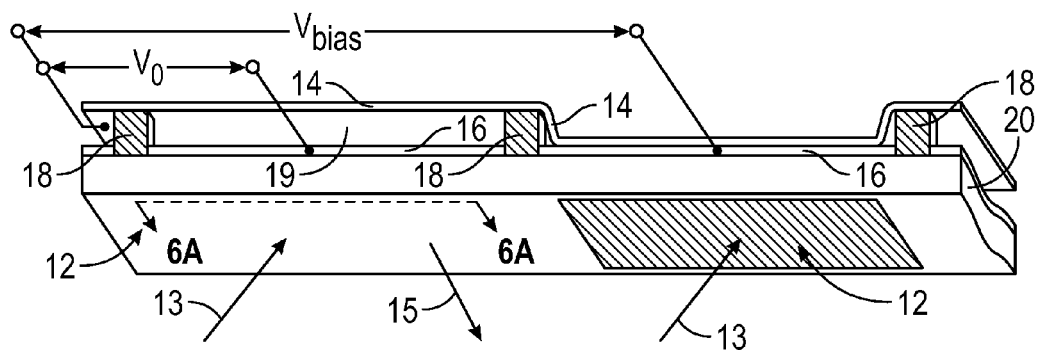
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The systems and methods described herein can be used to display high bit-depth color images (e.g., images having 8 bits per color channel) on a display device including a plurality of display elements having lower color bit-depth (for example, 1, 2 or 4 bits per color channel). Each display element of the display device can produce multiple primary colors (for example, greater than four (4) or six (6)) in a color space associated with the display device. To display high bit-depth color images (for example, with 8 bits per color channel or 256 color levels per color channel) on a multi-primary display device, temporal modulation or temporal dithering and/or spatial modulation can be used. For example, using temporal modulation or temporal dithering with four temporal frames and black and white colors, five colors including three gray levels can be displayed. As another example, using temporal modulation or temporal dithering with two temporal frames and black, white and a non-black and non-white primary color (e.g., red, green or blue), six colors can be displayed. Many different color levels can be produced by including more primary colors and temporal frames.

Systems and methods described herein can be used for rendering static images as well as video (e.g., video with fast moving objects) on multi-primary display devices. The systems and methods described herein can be used in display devices that have two modes of operation. In a first mode, the display device can be configured to operate at a frame rate of 60 Hz or higher (e.g., 120 Hz, 240 Hz, etc.). In a second mode, the display device can be configured to operate at a frame rate less than 60 Hz (e.g., 30 Hz). Various image rendering methods described herein combine spatial vector screening method or spatial dithering method with temporal dithering. Various implementations of the image rendering method described herein can utilize a stochastic screen to determine a spatial arrangement of different primary colors that when spatio-temporally combined produce the perception of a desired color by a human visual system (HVS). A single stochastic screen is used to determine the spatial arrangement of different primary colors to be displayed in different temporal frames. This method of rendering a desired color can reduce flicker and improve image quality as compared to other spatio-temporal color rendering methods in which the primary colors to be displayed in different temporal frames are determined using different dither screens. The stochastic screen can be configured to reduce a contrast difference between different sub-frames of temporal dithering. The stochastic screen can be configured such that the visual appearance of the image produced by each of the different temporal sub-frames is similar to an image produced by combining the K temporal sub-frames. The stochastic screen can be configured to distribute color difference between different sub-frames of temporal dithering into high spatial frequency region. In various implementations, the color (or brightness or contrast) differences between different sub-frames of temporal dithering can be isotropically distributed into high spatial frequency region. The color distributed differences between different sub-frames of temporal dithering can manifest visually as "blue noise." The implementations of stochastic screens described herein that can distribute color (or brightness or contrast) differences between different sub-frames of temporal dithering into high spatial frequency regions can advantageously reduce flicker.

Particular implementations of the subject matter described in this disclosure can be implemented to realize one or more of the following potential advantages. It is possible to display high bit-depth digital images on display devices having low native bit-depth multiple primary colors to render intermediate tones that cannot be natively displayed by the display device. The stochastic screen can be used to render images using vector screen or spatial dithering with or without temporal dithering. Additionally, the stochastic screen can be used to display images in a first mode in which the display device is configured to operate at a fast frame rate and a second mode in which the display device is configured to operate at a slower frame rate. In the first mode, the display device can be configured to display images and/or videos with few visual artifacts. In the second mode, the display device can be configured to display images with reduced power consumption. The display device can be configured such that it is always-on in the second mode. In various implementations, the display device can be configured to operate in the second mode when it is desirable to save energy. The display device can be configured such that it can be easily switched between the first and the second mode. The image rendering methods described herein can be applied to standard video streams in an image pipeline without requiring input or output image frame buffers.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20.

Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposlited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 µm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
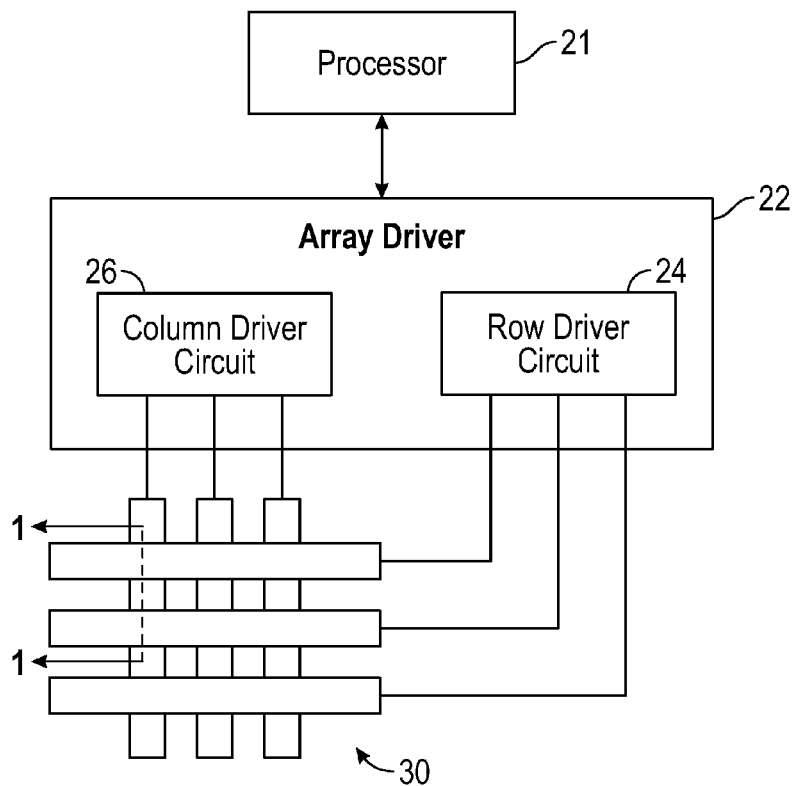
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figures 3, 4:
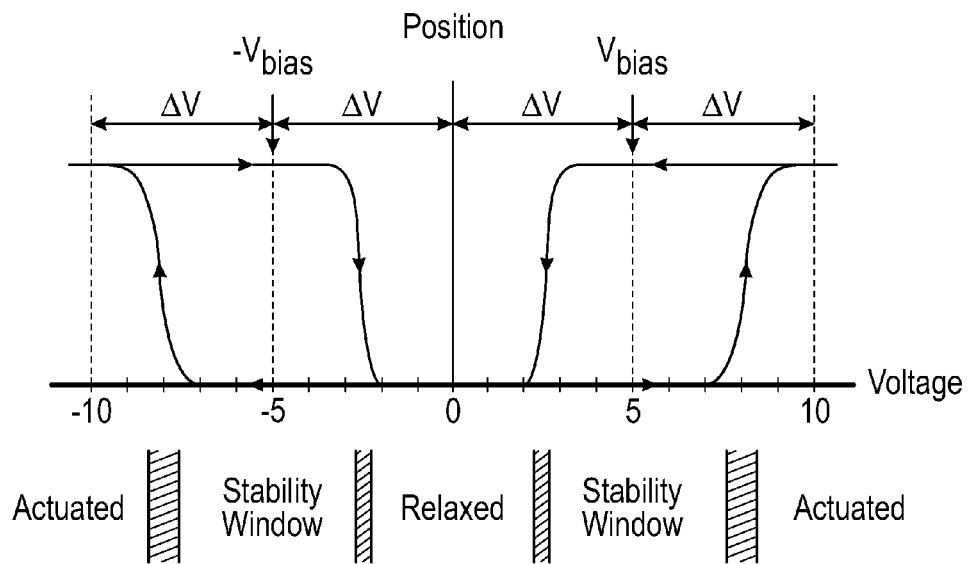
FIG. 3 is a graph illustrating movable reflective layer position versus applied voltage for an IMOD display element.
FIG. 4 is a table illustrating various states of an IMOD display element when various common and segment voltages are applied.

FIG. 3 is a graph illustrating movable reflective layer position versus applied voltage for an IMOD display element. For IMODs, the row/column (i.e., common/segment) write procedure may take advantage of a hysteresis property of the display elements as illustrated in FIG. 3. An IMOD display element may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3-7 volts, in the example of FIG. 3, exists where there is a window of applied voltage within which the element is stable in either the relaxed or actuated state. This is referred to herein as the "hysteresis window" or "stability window." For a display array 30 having the hysteresis characteristics of FIG. 3, the row/column write procedure can be designed to address one or more rows at a time. Thus, in this example, during the addressing of a given row, display elements that are to be actuated in the addressed row can be exposed to a voltage difference of about 10 volts, and display elements that are to be relaxed can be exposed to a voltage difference of near zero volts. After addressing, the display elements can be exposed to a steady state or bias voltage difference of approximately 5 volts in this example, such that they remain in the previously strobed, or written, state. In this example, after being addressed, each display element sees a potential difference within the "stability window" of about 3-7 volts. This hysteresis property feature enables the IMOD display element design to remain stable in either an actuated or relaxed pre-existing state under the same applied voltage conditions. Since each IMOD display element, whether in the actuated or relaxed state, can serve as a capacitor formed by the fixed and moving reflective layers, this stable state can be held at a steady voltage within the hysteresis window without substantially consuming or losing power. Moreover, essentially little or no current flows into the display element if the applied voltage potential remains substantially fixed.

In some implementations, a frame of an image may be created by applying data signals in the form of "segment" voltages along the set of column electrodes, in accordance with the desired change (if any) to the state of the display elements in a given row. Each row of the array can be addressed in turn, such that the frame is written one row at a time. To write the desired data to the display elements in a first row, segment voltages corresponding to the desired state of the display elements in the first row can be applied on the column electrodes, and a first row pulse in the form of a specific "common" voltage or signal can be applied to the first row electrode. The set of segment voltages can then be changed to correspond to the desired change (if any) to the state of the display elements in the second row, and a second common voltage can be applied to the second row electrode. In some implementations, the display elements in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each display element (that is, the potential difference across each display element or pixel) determines the resulting state of each display element. FIG. 4 is a table illustrating various states of an IMOD display element when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4, when a release voltage $VC_{REL}$ is applied along a common line, all IMOD display elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator display elements or pixels (alternatively referred to as a display element or pixel voltage) can be within the relaxation window (see FIG. 3, also referred to as a release window) both when the high segment voltage $VS_H$ and the low segment voltage $VS_L$ are applied along the corresponding segment line for that display element.

When a hold voltage is applied on a common line, such as a high hold voltage $VC_{HOLD\_H}$ or a low hold voltage $VC_{HOLD\_L}$, the state of the IMOD display element along that common line will remain constant. For example, a relaxed IMOD display element will remain in a relaxed position, and an actuated IMOD display element will remain in an actuated position. The hold voltages can be selected such that the display element voltage will remain within a stability window both when the high segment voltage $VS_H$ and the low segment voltage $VS_L$ are applied along the corresponding segment line. Thus, the segment voltage swing in this example is the difference between the high $VS_H$ and low segment voltage $VS_L$, and is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that common line by application of segment voltages along the respective segment lines. The segment voltages may be selected such that actuation is dependent upon the segment voltage applied. When an addressing voltage is applied along a common line, application of one segment voltage will result in a display element voltage within a stability window, causing the display element to remain unactuated. In contrast, application of the other segment voltage will result in a display element voltage beyond the stability window, resulting in actuation of the display element. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having substantially no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation that could occur after repeated write operations of a single polarity.

Figure 5:
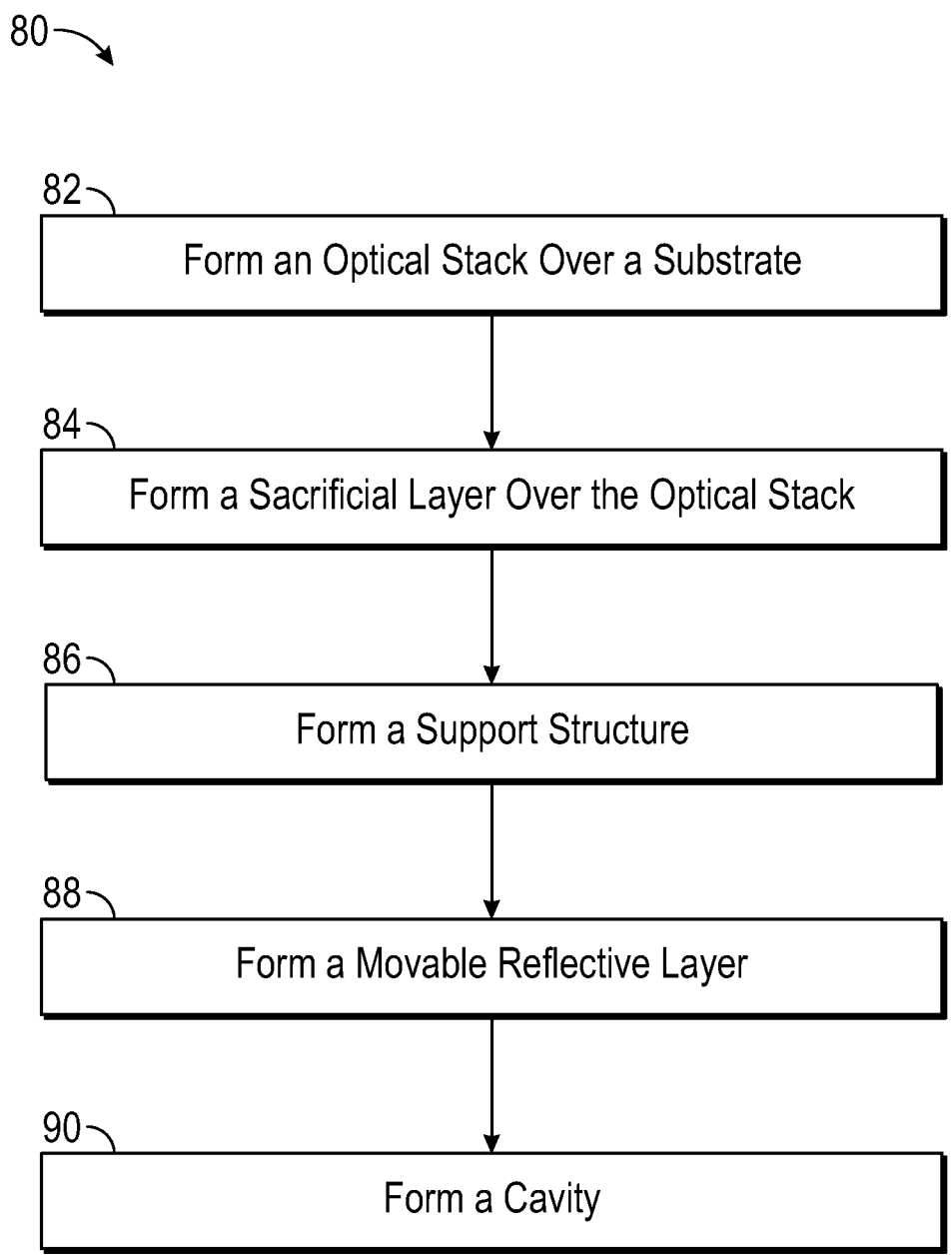
FIG. 5 is a flow diagram illustrating a manufacturing process for an IMOD display or display element.
Figure 6A:
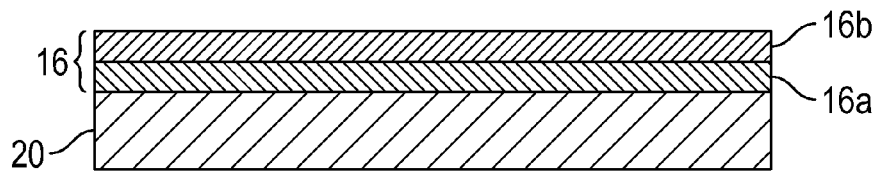
FIGS. 6A-6E are cross-sectional illustrations of various stages in a process of making an IMOD display or display element.

FIG. 5 is a flow diagram illustrating a manufacturing process 80 for an IMOD display or display element. FIGS. 6A-6E are cross-sectional illustrations of various stages in the manufacturing process 80 for making an IMOD display or display element. In some implementations, the manufacturing process 80 can be implemented to manufacture one or more EMS devices, such as IMOD displays or display elements. The manufacture of such an EMS device also can include other blocks not shown in FIG. 5. The process 80 begins at block 82 with the formation of the optical stack 16 over the substrate 20. FIG. 6A illustrates such an optical stack 16 formed over the substrate 20. The substrate 20 may be a transparent substrate such as glass or plastic such as the materials discussed above with respect to FIG. 1. The substrate 20 may be flexible or relatively stiff and unbending, and may have been subjected to prior preparation processes, such as cleaning, to facilitate efficient formation of the optical stack 16. As discussed above, the optical stack 16 can be electrically conductive, partially transparent, partially reflective, and partially absorptive, and may be fabricated, for example, by depositing one or more layers having the desired properties onto the transparent substrate 20.

In FIG. 6A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. In some implementations, one of the sub-layers 16a and 16b can include molybdenum-chromium (molychrome or MoCr), or other materials with a suitable complex refractive index. Additionally, one or more of the sub-layers 16a and 16b can be patterned into parallel strips, and may form row electrodes in a display device. Such patterning can be performed by a masking and etching process or another suitable process known in the art. In some implementations, one of the sub-layers 16a and 16b can be an insulating or dielectric layer, such as an upper sub-layer 16b that is deposited over one or more underlying metal and/or oxide layers (such as one or more reflective and/or conductive layers). In addition, the optical stack 16 can be patterned into individual and parallel strips that form the rows of the display. In some implementations, at least one of the sub-layers of the optical stack, such as the optically absorptive layer, may be quite thin (e.g., relative to other layers depicted in this disclosure), even though the sub-layers 16a and 16b are shown somewhat thick in FIGS. 6A-6E.

Figure 6B:
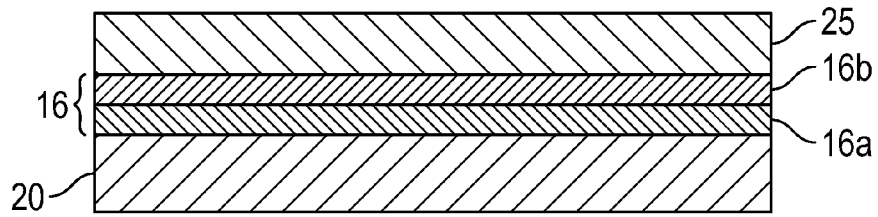

The process 80 continues at block 84 with the formation of a sacrificial layer 25 over the optical stack 16. Because the sacrificial layer 25 is later removed (see block 90) to form the cavity 19, the sacrificial layer 25 is not shown in the resulting IMOD display elements. FIG. 6B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIG. 6E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 6C:
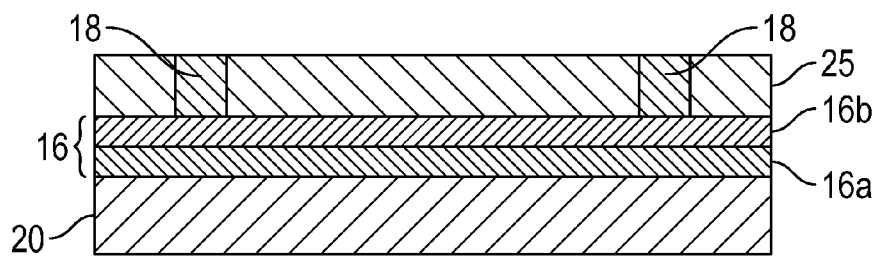

The process 80 continues at block 86 with the formation of a support structure such as a support post 18. The formation of the support post 18 may include patterning the sacrificial layer 25 to form a support structure aperture, then depositing a material (such as a polymer or an inorganic material, like silicon oxide) into the aperture to form the support post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the support post 18 contacts the substrate 20. Alternatively, as depicted in FIG. 6C, the aperture formed in the sacrificial layer 25 can extend through the sacrificial layer 25, but not through the optical stack 16. For example, FIG. 6E illustrates the lower ends of the support posts 18 in contact with an upper surface of the optical stack 16. The support post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 6C, but also can extend at least partially over a portion of the sacrificial layer 25. As noted above, the patterning of the sacrificial layer 25 and/or the support posts 18 can be performed by a masking and etching process, but also may be performed by alternative patterning methods.

Figure 6D:
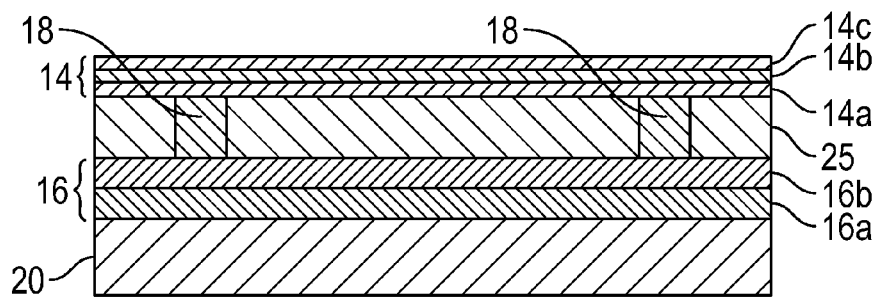
Figure 6E:
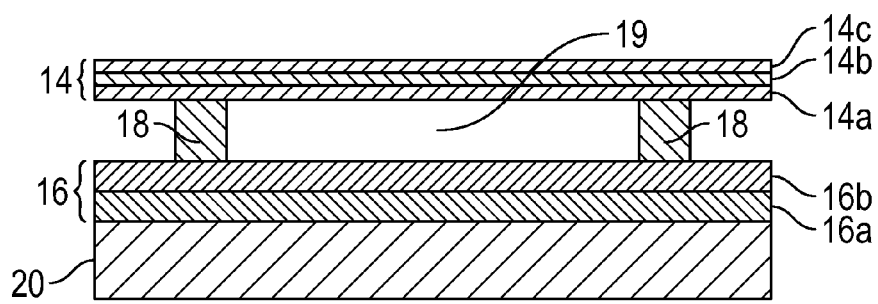

The process 80 continues at block 88 with the formation of a movable reflective layer or membrane such as the movable reflective layer 14 illustrated in FIG. 6D. The movable reflective layer 14 may be formed by employing one or more deposition steps, including, for example, reflective layer (such as aluminum, aluminum alloy, or other reflective materials) deposition, along with one or more patterning, masking and/or etching steps. The movable reflective layer 14 can be patterned into individual and parallel strips that form, for example, the columns of the display. The movable reflective layer 14 can be electrically conductive, and referred to as an electrically conductive layer. In some implementations, the movable reflective layer 14 may include a plurality of sub-layers 14a, 14b and 14c as shown in FIG. 6D. In some implementations, one or more of the sub-layers, such as sub-layers 14a and 14c, may include highly reflective sub-layers selected for their optical properties, and another sub-layer 14b may include a mechanical sub-layer selected for its mechanical properties. In some implementations, the mechanical sub-layer may include a dielectric material. Since the sacrificial layer 25 is still present in the partially fabricated IMOD display element formed at block 88, the movable reflective layer 14 is typically not movable at this stage. A partially fabricated IMOD display element that contains a sacrificial layer 25 also may be referred to herein as an "unreleased" IMOD.

The process 80 continues at block 90 with the formation of a cavity 19. The cavity 19 may be formed by exposing the sacrificial material 25 (deposited at block 84) to an etchant. For example, an etchable sacrificial material such as Mo or amorphous Si may be removed by dry chemical etching by exposing the sacrificial layer 25 to a gaseous or vaporous etchant, such as vapors derived from solid $XeF_2$ for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD display element may be referred to herein as a "released" IMOD.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 7A:
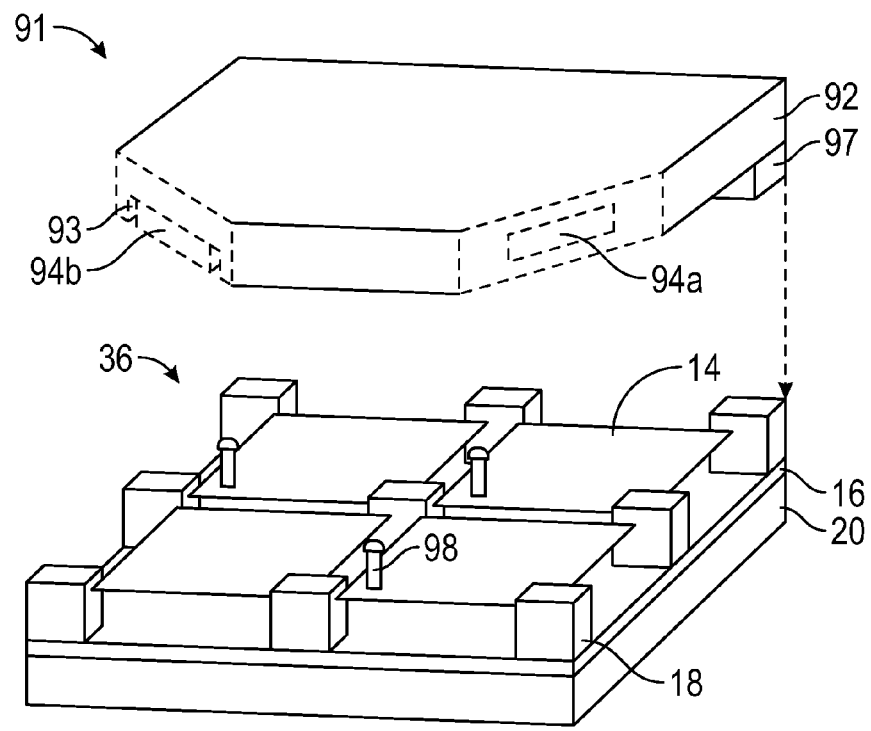
FIGS. 7A and 7B are schematic exploded partial perspective views of a portion of an electromechanical systems (EMS) package including an array of EMS elements and a backplate.
Figure 7B:
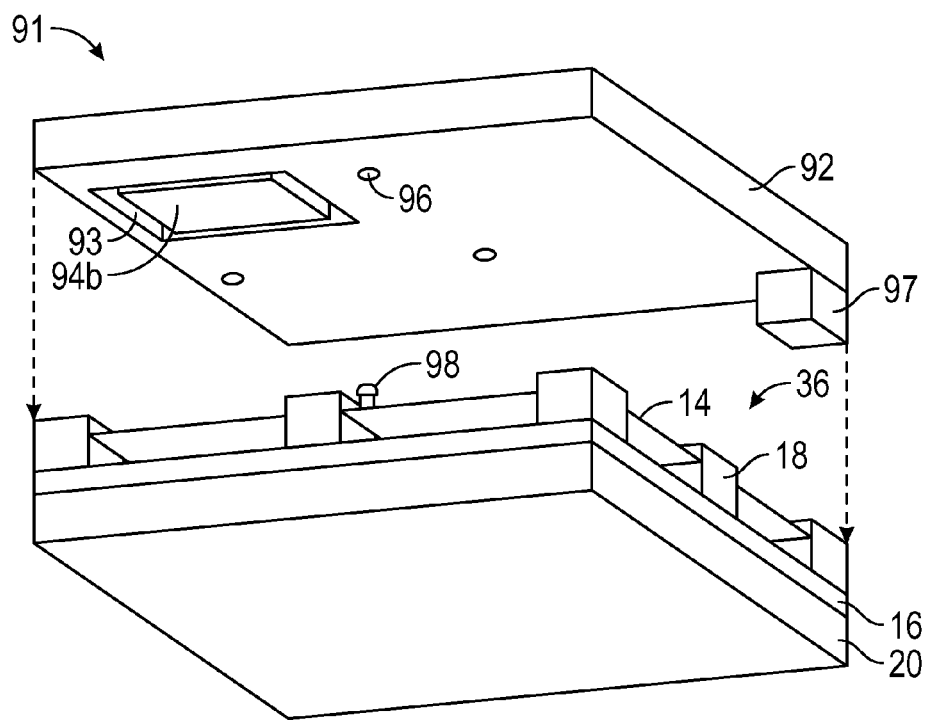

FIGS. 7A and 7B are schematic exploded partial perspective views of a portion of an EMS package 91 including an array 36 of EMS elements and a backplate 92. FIG. 7A is shown with two corners of the backplate 92 cut away to better illustrate certain portions of the backplate 92, while FIG. 7B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 7A and 7B, the backplate 92 can include one or more backplate components 94a and 94b, which can be partially or wholly embedded in the backplate 92. As can be seen in FIG. 7A, backplate component 94a is embedded in the backplate 92. As can be seen in FIGS. 7A and 7B, backplate component 94b is disposed within a recess 93 formed in a surface of the backplate 92. In some implementations, the backplate components 94a and/or 94b can protrude from a surface of the backplate 92. Although backplate component 94b is disposed on the side of the backplate 92 facing the substrate 20, in other implementations, the backplate components can be disposed on the opposite side of the backplate 92.

The backplate components 94a and/or 94b can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94a and/or 94b can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94a and/or 94b. For example, FIG. 7B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94a and/or 94b from other components of the EMS array 36. In some implementations in which the backplate 92 is formed from vapor-permeable materials, an interior surface of backplate 92 can be coated with a vapor barrier (not shown).

The backplate components 94a and 94b can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 7A and 7B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 7A and 7B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

Various implementations of a multi-primary display device can include the EMS array 36. The EMS elements in the array can include one or more IMODs. In some implementations the IMOD can include an analog IMOD (AIMOD). The AIMOD may be configured to selectively reflect multiple primary colors and provide 1 bit per color.

Figure 8:
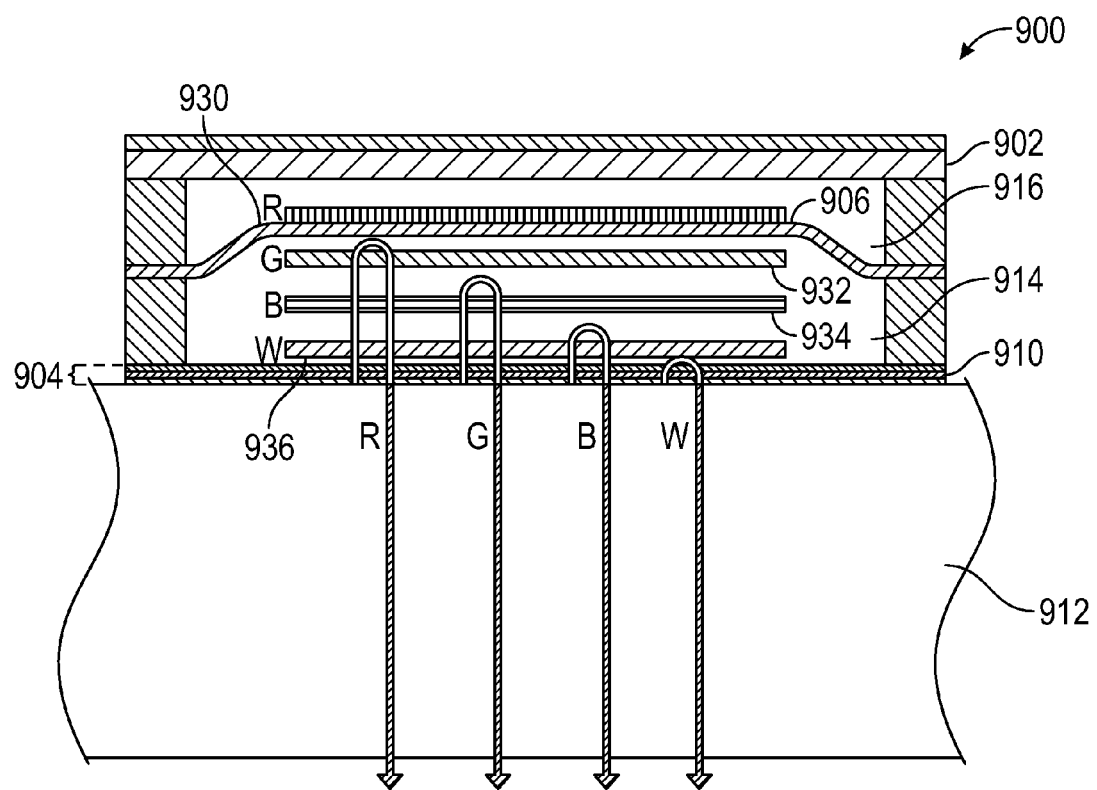
FIG. 8 shows a cross-section of an implementation of an analog IMOD (AIMOD).

FIG. 8 shows a cross-section of an implementation of an AIMOD. The AIMOD 900 includes a substrate 912 and an optical stack 904 disposed over the substrate 912. The AIMOD includes a first electrode 910 and a second electrode 902 (as illustrated, the first electrode 910 is a lower electrode, and second electrode 902 is an upper electrode). The AIMOD 900 also includes a movable reflective layer 906 disposed between the first electrode 910 and the second electrode 902. In some implementations, the optical stack 904 includes an absorbing layer, and/or a plurality of other layers. In some implementations, and in the example illustrated in FIG. 8, the optical stack 904 includes the first electrode 910 which is configured as an absorbing layer. In such a configuration, the absorbing layer (first electrode 910) can be an approximately 6 nm layer of material that includes MoCr. In some implementations, the absorbing layer (that is, the first electrode 910) can be a layer of material including MoCr with a thickness ranging from approximately 2 nm to 50 nm.

The reflective layer 906 can be actuated toward either the first electrode 910 or the second electrode 902 when a voltage is applied between the first and second electrodes 910 and 902. In this manner, the reflective layer 906 can be driven through a range of positions between the two electrodes 902 and 910, including above and below a relaxed (unactuated) state. For example, FIG. 8 illustrates that the reflective layer 906 can be moved to various positions 930, 932, 934 and 936 between the first electrode 910 and the second electrode 902.

The AIMOD 900 in FIG. 8 has two structural cavities, a first cavity 914 between the reflective layer 906 and the optical stack 904, and a second cavity 916 between the reflective layer 906 and the second electrode 902. In various implementations, the first cavity 914 and/or the second cavity can include air. The color and/or intensity of light reflected by the AIMOD 900 is determined by the distance between the reflective layer 906 and the absorbing layer (first electrode 910).

The AIMOD 900 can be configured to selectively reflect certain wavelengths of light depending on the configuration of the AIMOD. The distance between the first electrode 910, which in this implementation acts as an absorbing layer and the reflective layer 906 changes the reflective properties of the AIMOD 900. Any particular wavelength is maximally reflected from the AIMOD 900 when the distance between the reflective layer 906 and the absorbing layer (first electrode 910) is such that the absorbing layer (first electrode 910) is located at the minimum light intensity of standing waves resulting from interference between incident light and light reflected from the reflective layer 906. For example, as illustrated, the AIMOD 900 is designed to be viewed from the substrate 912 side of the AIMOD (through the substrate 912), that is, light enters the AIMOD 900 through the substrate 912. Depending on the position of the reflective layer 906, different wavelengths of light are reflected back through the substrate 912, which gives the appearance of different colors. These different colors are also referred to as native or primary colors. The number of primary colors produced by the AIMOD 900 can be greater than 4. For example, the number of primary colors produced by the AIMOD 900 can be 5, 6, 8, 10, 16, 18, 33, etc.

A position of the movable layer 906 at a location such that it reflects a certain wavelength or wavelengths can be referred to as a display state of the AIMOD 900. For example, when the reflective layer 906 is in position 930, red wavelengths of light are reflected in greater proportion than other wavelengths and the other wavelengths of light are absorbed in greater proportion than red. Accordingly, the AIMOD 900 appears red and is said to be in a red display state, or simply a red state. Similarly, the AIMOD 900 is in a green display state (or green state) when the reflective layer 906 moves to position 932, where green wavelengths of light are reflected in greater proportion than other wavelengths and the other wavelengths of light are absorbed in greater proportion than green. When the reflective layer 906 moves to position 934, the AIMOD 900 is in a blue display state (or blue state) and blue wavelengths of light are reflected in greater proportion than other wavelengths and the other wavelengths of light are absorbed in greater proportion than blue. When the reflective layer 906 moves to a position 936, the AIMOD 900 is in a white display state (or white state) and a broad range of wavelengths of light in the visible spectrum are substantially reflected such that and the AIMOD 900 appears "gray" or in some cases "silver," and having low total reflection (or luminance) when a bare metal reflector is used. In some cases increased total reflection (or luminance) can be achieved with the addition of dielectric layers disposed on the metal reflector, but the reflected color may be tinted with blue, green or yellow, depending on the exact position of 936. In some implementations, in position 936, configured to produce a white state, the distance between the reflective layer 906 and the first electrode 910 is between about 0 and 20 nm. In other implementations, the AIMOD 900 can take on different states and selectively reflect other wavelengths of light based on the position of the reflective layer 906, and also based on materials that are used in construction of the AIMOD 900, particularly various layers in the optical stack 904.

The multiple primary colors displayed by a display element (for example, AIMOD 900) and the possible color combinations of the multiple primary colors displayed by a display element can represent a color space associated with the display element. A color in the color space associated with the display device can be identified by a color level that represents tone, grayscale, hue, chroma, saturation, brightness, lightness, luminance, correlated color temperature, dominant wavelength, or a coordinate in the color space associated with the display element.

Figure 9:
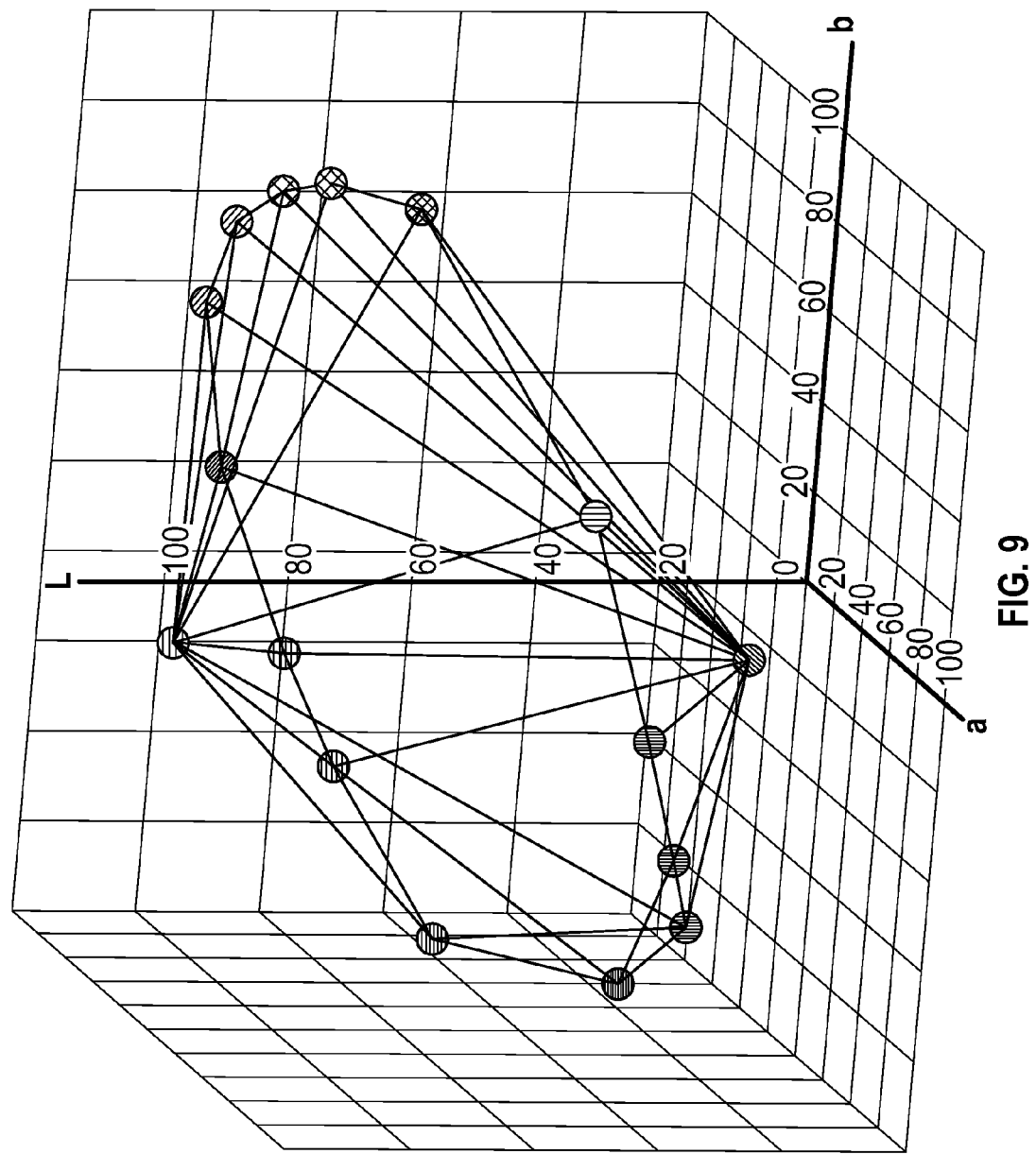
FIG. 9 shows an example of a color gamut produced by a multi-primary display device and the standard sRGB color gamut.

FIG. 9 shows an example of a color gamut produced by a multi-primary display device and the standard sRGB color gamut. The color gamut of an implementation of a multi-primary display device has a polyhedron shape defined by N discrete primary colors produced by the display device and their linear combinations. In the color gamut shown in FIG. 9, sixteen (16) discrete primary colors are selected. Accordingly, N=16. In some implementations, the discrete primary colors can be selected from a spiral curve in the color space. By spatial and/or temporal mixing of these primaries, the human visual system perceives a full spectrum of colors as a result of color blending. Any color located inside the polyhedron gamut can be obtained by color blending, as long as the spatial resolution and/or the temporal frame rate is sufficiently high. To choose appropriate primary combinations, the color image can be rendered in a vector manner, i.e., to determine the appropriate output primary colors the input colors in the 3-dimensional (3D) color space can be investigated. Various implementations disclosed herein are directed towards selecting primary colors from a set including a large number of discrete primary colors (e.g., greater than four (4) or six (6)) to represent a color in a color space (for example, color space associated with a display device or a standard color space).

There are many methods for spatial and temporal color blending. One method to render images and/or videos on a display device includes error diffusion. Without subscribing to any particular theory, error diffusion includes halftoning methods in which a color difference (or an error) between the color of an incoming image pixel and the color of the corresponding display pixel to which the incoming image pixel is mapped is distributed to neighboring pixels. Another method to render images and/or videos includes screening. Without subscribing to any particular theory, screening includes halftoning methods in which the color of an incoming image pixel light is compared with a screen that is constructed to have specific properties. The color of the corresponding display pixel to which the incoming image pixel is mapped is determined based on the comparison.

Without subscribing to any particular theory, error diffusion based approaches can render static images better than screening based methods. Without subscribing to any particular theory, screening based approaches can render video images better than error-diffusion based methods. Screening based approaches can be more robust to moving objects and have fewer motion artifacts while rendering videos of moving objects.

It is also possible to render images on a multi-primary display device using temporal dithering which can output different colors by blending different primary colors of the multi-primary display device temporally. For example, a 2× temporal dithering scheme that alternately displays one of 16 primary colors that can be output by a display element of a multi-primary display device in two sub-frames can provide as many as 136 different color outputs. By combining temporal and spatial dithering (e.g., error diffusion and/or screening based approaches), it is possible to improve image and video quality, as disclosed herein.

Figure 10:
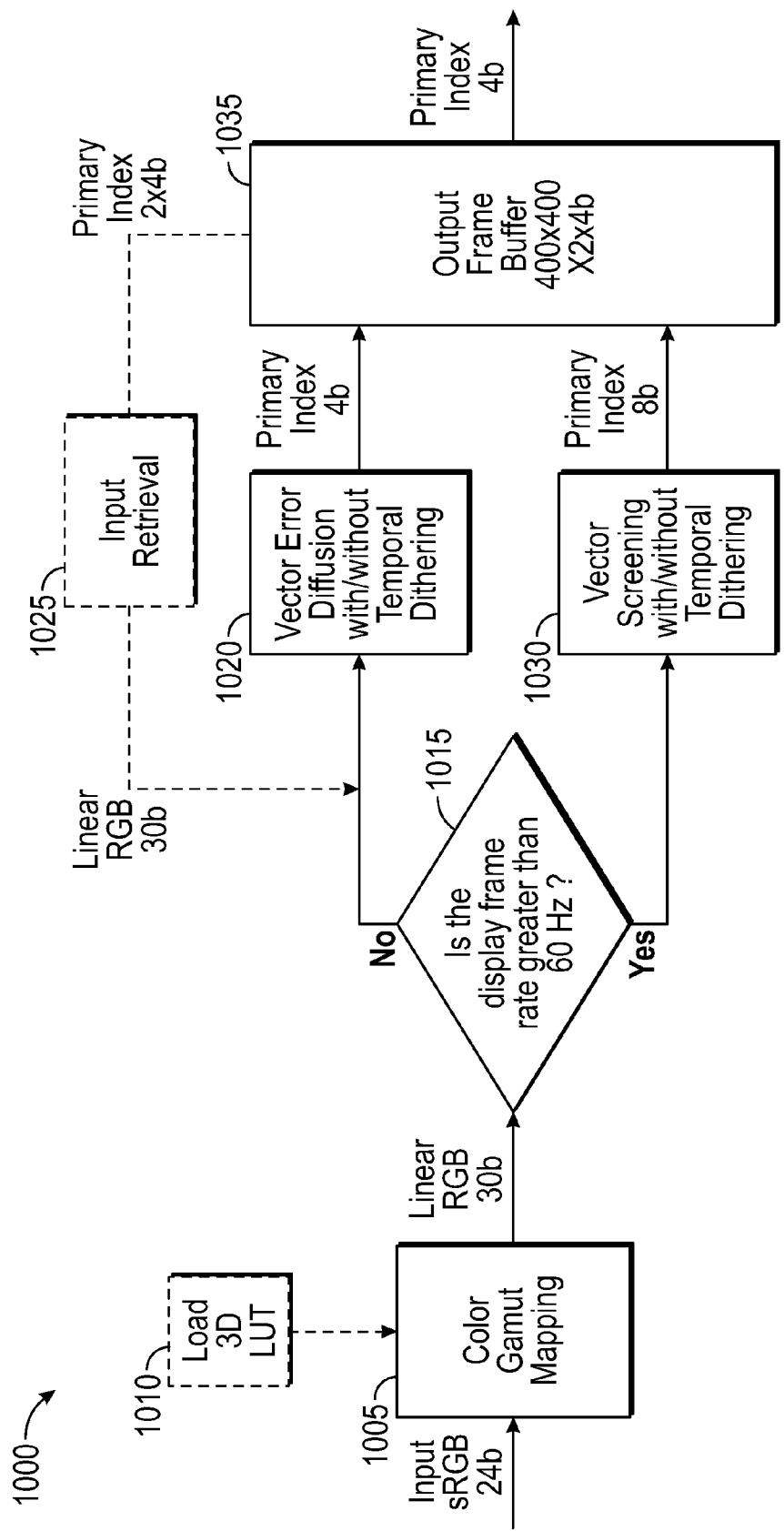
FIG. 10 is a functional block diagram that describes an implementation of a method of displaying an image on a multi-primary display device.

FIG. 10 is a functional block diagram that describes an implementation of a method 1000 of displaying an image on a multi-primary display device. Various implementations of the multi-primary display device can include an AIMOD 900. The various functional blocks illustrated in FIG. 10 can be implemented with processors executing instructions included in a machine-readable non-transitory storage medium, such as a RAM, ROM, EEPROM, etc. The various functional blocks can be implemented with electronic processors, micro-controllers, FPGA's, etc. The various functional blocks illustrated in FIG. 10 are described below.

The functional block 1005 is a color gamut mapping unit that is configured to receive an input image in a first color space and map it to a second color space. The second color space can be a color space associated with the display device. In various implementations, the first color space can be a sRGB color space and the second color space can be a linear RGB color space. In various implementations, the input image can be a 24-bit sRGB image and the image output from the color gamut mapping unit 1005 can be a 30-bit linear RGB image. The method further includes loading a look-up-table (LUT) as shown in block 1010 that can be accessed by the color gamut mapping unit 1005 to map the input image from the first color space to the second color space. The LUT can include colors in the second color space that correspond to the colors in the first color space.

In various implementations, the LUT can be a 3D LUT interpolation unit with U×U×U vertices. In implementations where the first color space is a sRGB color space and the second color space is a linear RGB color space, U can have a value of 9. The LUT can be re-loadable for different illumination environments. In various implementations, the LUT can be generated using an interpolation method such as, for example, tetrahedral interpolation method.

The functional block 1015 in FIG. 10 is an operation mode selector. The operation mode selector 1015 is configured to choose one of the two display modes. A first display mode is a standard display mode. The standard display mode is a dynamic display mode, in which a display state of some or all of the various display elements is changed such that the image is displayed at a frame rate greater than 60 Hz. A second display mode is an always-on mode. In the always-on mode, an image is displayed at a frame rate less than 60 Hz such that the displayed image appears to be static over a period of time. In various implementations, the operation mode can depend on the display device frame rate. For example, if the display device is operating/running at frame rates greater than or equal to 60 Hz, images and/or videos are displayed using a standard mode wherein images and/or videos processed by a vector screening with/without temporal dithering halftoning unit 1030 are displayed. As another example, if the display device is operating/running at frame rates less than 60 Hz, images and/or videos are displayed using an always-on mode wherein images processed by a vector error diffusion with/without temporal ditherin halftoning unit 1020 are displayed. The images rendered by the display device using the standard mode or the always-on mode can be stored in an output buffer 1035. In various implementations, the method 1000 can reconstruct the input image based on the information stored in the output buffer 1035 using an input retrieval unit 1025. In various implementations, the mode selector 1015 is capable of detecting the status of the display frame rate. Additionally, the mode selector 1015 can be configured to function correspondingly if the display device receives commands from a host or a power-control unit to change the display mode. For example, when the host stops sending video input and an always-on display is desired, the selector 1015 can switch to the always-on mode and utilize the input retrieval unit 1025 and the image stored in the output frame buffer 1035 to generate a new dithered output image for always-on display.

The vector error diffusion based halftoning unit 1020 provides power-saving advantage when the display device is operating/running at frame rates lower than 60 Hz (e.g., 30 Hz). Vector error diffusion based halftoning can provide over-all higher quality than the screening dithering method for static images. Vector error diffusion based halftoning can also be used for generating an output image that can be saved in the output frame buffer 1035 for the always-on display (e.g., when the display module stops receiving video input from the host).

In various implementations, the vector screening unit 1030 can be used to render videos or images having regions with color gradients while the vector error diffusion based halftoning unit 1020 can be used to render static images. However, in some implementations vector error diffusion based halftoning unit 1020 can be associated with visual artifacts that can reduce the image quality. The vector screening unit 1030 can provide good image quality for both static images and video streams. The standard display mode requires the display device running at a frame rate of 60 Hz or higher (e.g., 120 Hz). If the display input from host is also clocked with the same frame rate, the vector screening unit 1030 can be used to process the display input, frame by frame, and send the corresponding halftone output to the output frame buffer 1035 for display by the display device. If the input has frame rates less than the display frame rate, the vector screening unit 1030 can be used to process the input and send two- (or more) frame outputs to the output frame buffer 1035. The display device, running at 60 Hz or a higher frame rate, can cycle the two (or more) frame outputs in the output frame buffer 1035 until the buffer refreshed by the next frame output by the vector screening unit 1030. Further details of vector screening unit 1030 are discussed below.

The output frame buffer 1035 is configured to store output from the two halftoning units 1020 and 1030 described above. In various implementations, two or more frames can be used for the output generated by the vector screening and temporal dithering unit 1030 and only one frame is used for the output generated by the vector error diffusion based unit 1020. Besides being used for the situation when the frame rate of the display device is higher than the frame rate of the input signal, the output frame buffer 1035 can also provide the input for the input image retrieval unit as described below. In various implementations, the size of the required output frame buffer can be 400×400×2×4 bits, where 4 bits are used for storing the primary index for each pixel in each frame and 2 frames are used for a display device operating/running at 60 Hz. If the display device is operating/running at higher frame rate, the output buffer 1035 may contain more frames. For example, in various implementations, 3 frames may be used for a display device operating at 90 Hz frame rate and 4 frames may be used for a display device operating at 120 Hz frame rate.

It may be desirable to be able to switch back and forth between the two operation modes (standard and always-on mode). For example, when the host stops sending 60 Hz video input to the display running at 60 Hz, the system can be configured to retain the last frame image on display, the two halftone images stored in the output frame buffer 1035 may not be capable of providing acceptable halftone image for the always-on display. However, the combined information of the two halftone images in the output buffer bears a resemblance to the original last frame. The input image retrieval unit 1025 can be configured to translate the primary indices to RGB values and combine the two output frames to retrieve the original RGB input. The retrieved RGB input can be sent to the vector error diffusion based halftoning unit 1020 to obtain one-frame halftone output which can be used for the always-on display.

3D LUT Tetrahedral Interpolation

As discussed above, the color gamut mapping unit functional block 1005 can receive an input image in a first color space and map it to a second color space. The color gamut mapping unit 1005 can use a variety of methods to map the colors of an input image from a first color space to a second colors. For example, as discussed above, the colors of an input image can be mapped from a first color space to a second colors a tetrahedron interpolation method. The tetrahedron interpolation method can employ a three dimensional look-up table (LUT). In various implementations of the method 1000 illustrated in FIG. 10, the LUT can be a 3D LUT with 9×9×9 vertices. The input image can be a sRGB color image with unsigned 24 bits, and the output can be a linear RGB image including three colors with 30 bits. Therefore, the size of each table in the 3D LUT can have 9×9×9×30 bits.

Vector Screening

Vector screening can employ a pixel-based halftoning method. In such implementations, the halftone output of each pixel by vector screening depends on the input RGB values of the pixel and a value on a halftone screen that is constructed to have specific properties associated with the pixel. In various implementations, the halftone screen can be a pre-determined two-dimensional matrix with specific values assigned to each matrix element. The halftone output of each pixel by vector error diffusion depends on the input RGB values of the pixel and the error associated with the processing of a neighboring pixel. In contrast to vector error diffusion, the output obtained by vector screening is influenced by neither the input nor the output of neighborhood pixels. Therefore, visual artifacts that may occur in other image rendering methods may not occur in vector screening. Although in general error diffusion based halftoning methods can provide shaper and smoother halftone images, vector screening may be advantageous for processing video streams. Vector screening can be implemented using a programmable circuit or a processor (for example, halftoning unit 1030).

Figures 11A, 11B:
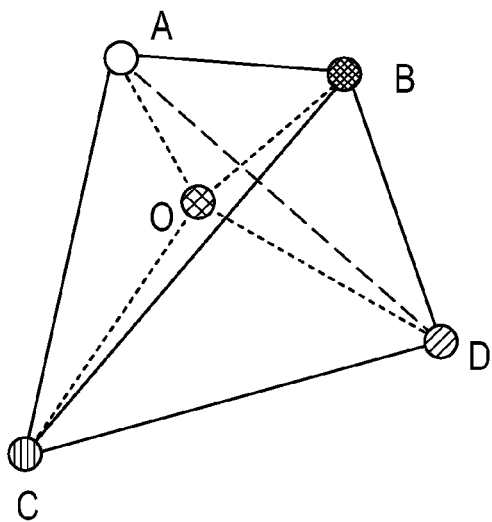
FIG. 11A illustrates an example of representing an input color (O) by blending four different primary colors associated with a multi-primary display device using a vector screening halftoning method.
FIG. 11B is an example of a halftone screen including 14×14 elements that can be used in vector screening.

Screening based halftoning methods can be divided into two groups: scalar screening and vector screening. A scalar screening method operates binary or multi-level thresholding in R, G and B channels independently to generate corresponding discrete R, G and B halftone outputs. The three halftone screens used in these three channels can be the same or different. Various implementations of the vector screening method discussed herein select the halftone output in a vector manner in the 3D RGB space and use only one halftone screen. An example of the vector screening process for a multi-primary display device (for example, a display device including an AIMOD 900) using four primary colors can be described as follows:

1. For each pixel (x,y) with a given color $O(R_O, G_O, B_O)$, from all tetrahedrons defined by four primaries, find one which encloses the given color O inside the tetrahedron. The four primaries can be referred to as $A(R_A, G_A, B_A)$, $B(R_B, G_B, B_B)$, $C(R_C, G_C, B_C)$ and $D(R_D, G_D, B_D)$;
2. Calculate the weights for blending the four primaries together to yield an average color equal to the given color O. FIG. 11A illustrates an example of representing an input color (O) by blending four different primary colors associated with a multi-primary display device using a vector screening halftoning method. As shown in FIG. 11A, the point O inside ABCD divides the tetrahedron into four sub-tetrahedrons, OBCD, AOCD, ABOD and ABCO. Then, four blending weights are defined by $$w_A = V_{OBCD}/V_{ABCD}, \quad (1a)$$

$$w_B = V_{AOCD}/V_{ABCD}, \quad (1b)$$

$$w_C = V_{ABOD}/V_{ABCD}, \quad (1c)$$

$$w_D = V_{ABCO}/V_{ABCD}, \quad (1d)$$

where $V_{ABCD}$ denotes the volume of the tetrahedron ABCD. The sum of the four weights above is one, if the color point O is within the tetrahedron ABCD. Therefore, only the first three weights can be calculated by Eqs. 1(a)-1(d) in vector screening. If the color space used in above calculation is linear RGB as a linear combination of the CIE XYZ color space, the desired color O can be obtained by spatially blending the four primaries with corresponding weights, i.e., $$R_O = w_A*R_A + w_B*R_B + w_C*R_C + w_D*R_D, \quad (2a)$$

$$G_O = w_A*G_A + w_B*G_B + w_C*G_C + w_D*G_D, \quad (2b)$$

$$B_O = w_A*B_A + w_B*B_B + w_C*B_C + w_D*B_D; \quad (2c)$$

3. Find the output primary A, B, C or D for the given spatial location (x,y) using a pre-defined halftone screen. The halftone screen is a large matrix covering the entire image area (e.g., 400×400 elements for an implementation of a display device). In some implementations, a smaller matrix with 128×128 elements can be used instead. In various implementations the halftone screen can include at least 64×64 elements in order to reduce tiling effects. In various implementations, the halftone screen can be considered as a fixed mask or filter that is associated with the display device and does not shift as different input image pixels are processed. Each element of the screen contains a rank order S(x,y), S=1, 2 . . . N, where N is the lowest rank, or 128×128 for the implementation in which the screen has 128×128 elements. FIG. 11B is an example of a halftone screen 1105 including 14×14 elements that can be used in vector screening. The output primary P is determined by the following inequalities:

$$P = A, \text{ if } S(x,y) < N_A, \quad (3a)$$

$$P = B, \text{ if } S(x,y) \geq N_A \text{ and } S(x,y) < N_A + N_B, \quad (3b)$$

$$P = C, \text{ if } S(x,y) \geq N_A + N_B \text{ and } S(x,y) < N_A + N_B + N_C, \quad (3c)$$

$$P = D, \text{ if } S(x,y) \geq N_A + N_B + N_C, \quad (3d)$$

where $N_A = w_A N, N_B = w_B N$ and $N_C = w_C N$. \quad (3e)

For various implementations, the rank orders stored in the halftone screen, S(x,y), and the three weighting factors, $N_A$, $N_B$ and $N_C$, can be normalized into any integer ranges (e.g., 8-bit integers, 0-255 or a percentage range, 0-100). If the three weighting factors, $N_A$, $N_B$ and $N_C$ are normalized as 8-bit integers, a 128×128 halftone screen corresponds to 16K-byte memory space.

The image rendering method using vector screening is illustrated by the following example. In this example, a percentage range, 1-100 is used. The desired color can be assumed to be constant for all display elements and to be within the tetrahedron defined by four primaries, A (white), B (orange), C (red) and D (black) for this example. The weights obtained from equations 1(a)-(1d) above are $w_A = 0.33$, $w_B = 0.24$, $w_C = 0.2$, $w_D = 0.23$. The three accumulated weighting factors are: $N_A = 33$, $N_A + N_B = 57$, $N_A + N_B + N_C = 77$.

Figures 11C, 12:
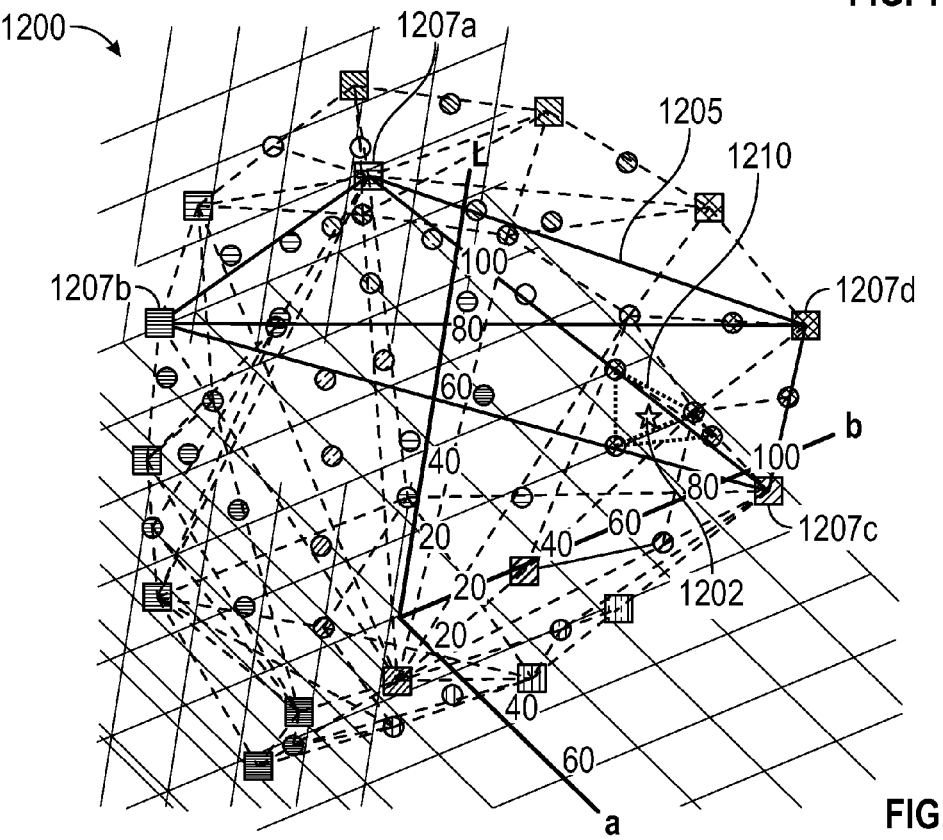
FIG. 11C illustrates the color output by various display elements of a multi-primary color display device using the halftone screen illustrated in FIG. 11B.
FIG. 12 shows an example of a color gamut produced by a multi-primary display device in CIE Lab color space.

The halftone screen shown in FIG. 11B has N=196 elements. The output primary color for each display element can be determined by including the threshold values of the halftone screen and the three accumulated weight factors in the inequalities 3(a)-3(d), as shown in FIG. 11C which illustrates the color output by various display elements of a multi-primary color display device 1110 (e.g., an AIMOD display device 900). By using the halftone screen illustrated in FIG. 11B, display elements of display device 1110 that correspond to the halftone screen elements having value less than 33 are configured to output primary color A (white), display elements of display device 1110 that correspond to the halftone screen elements having value between 33 and 56 are configured to output primary color B (orange), display elements of display device 1110 that correspond to the halftone screen elements having value between 57 and 76 are configured to output primary color C (red) and display elements of display device 1110 that correspond to the halftone screen elements having value above 76 are configured to output primary color D (black).

The majority of the computation involved in the vector screening described above is calculating volumes of tetrahedrons. One way to calculate the volume of a tetrahedron is given by the following equation, $$V_{ABCD} = h_A * A_{BCD}/6, \quad (4)$$

where $A_{BCD}$ is the area of the triangle defined by the three primary colors, B, C or D and $h_A$ is the distance from the point representing the primary color A to the plane defined by the three primary colors, B, C or D in the 3D color space. The area of the triangle, $A_{BCD}$, is given by $$A_{BCD} = 1/2 \begin{vmatrix} 1 & 1 & 1 \\ R_C - R_B & G_C - G_B & B_C - B_B \\ R_D - R_B & G_D - G_B & B_D - B_B \end{vmatrix}, \quad (5)$$

A plane defined by three primary colors, $B(R_B, G_B, B_B)$, $C(R_C, G_C, B_C)$ and $D(R_D, G_D, B_D)$ in the RGB color space can be represented by the following equation, $$a*R + b*G + c*B + d = 0, \quad (6)$$

where R, G or B are the color variables, a, b, c and d are four parameters of the plane BCD. The four parameters can be determined by $$a = -d/W \begin{vmatrix} 1 & G_B & B_B \\ 1 & G_C & B_C \\ 1 & G_D & B_D \end{vmatrix}, \quad (7a)$$

$$b = -d/W \begin{vmatrix} R_B & 1 & B_B \\ R_C & 1 & B_C \\ R_D & 1 & B_D \end{vmatrix}, \quad (7b)$$

$$c = -d/W \begin{vmatrix} R_B & G_B & 1 \\ R_C & G_C & 1 \\ R_D & G_D & 1 \end{vmatrix}, \quad (7c)$$

$$\text{where } W = \begin{vmatrix} R_B & G_B & B_B \\ R_C & G_C & B_C \\ R_D & G_D & B_D \end{vmatrix}. \quad (7d)$$

The distance from the primary color $A(R_A, G_A, B_A)$ to this plane is given by the amplitude of $$h_A = (a*R_A + b*G_A + c*B_A + d)/\sqrt{a*a + b*b + c*c}. \quad (8)$$

The sign of $h_A$ given by Eq. 8 indicates the location of point A on which side of the plane BCD.

Without detailed derivation, one may find that the three rank numbers, $N_A$, $N_B$ and $N_C$ defined by Eq. 3e and used in Eqs. 3a-3d to determine the output primary P for a given location (x,y) and a given color $(R_O, G_O, B_O)$, can be summarized as a matrix computation given by Eq. 9.

$$\begin{bmatrix} N_A \\ N_B \\ N_C \end{bmatrix} = \begin{bmatrix} m_{11} & m_{12} & m_{13} \\ m_{21} & m_{22} & m_{23} \\ m_{31} & m_{32} & m_{33} \end{bmatrix} \cdot \begin{bmatrix} R_o \\ G_o \\ B_o \end{bmatrix} + \begin{bmatrix} m_{10} \\ m_{20} \\ m_{30} \end{bmatrix}. \quad (9)$$

All 12 coefficients $m_{ij}$ in Eq. 9 are functions of the four primary colors, A ($R_A$, $G_A$, $B_A$), B ($R_B$, $G_B$, $B_B$), C ($R_C$, $G_C$, $B_C$) and D ($R_D$, $G_D$, $B_D$), and can be calculated using Eqs. 1-8. When 16 primary colors are used, only a limited number of tetrahedrons are used for the vector screening. For each of the chosen tetrahedron defined by four primary colors, the 12 coefficients $m_{ij}$ can be pre-calculated and stored in a look-up-table. Therefore, once the tetrahedron, corresponding to a given input RGB color, ($R_O$, $G_O$, $B_O$), is determined for each pixel, the required computation can be nine multiplications plus limited additions and comparisons.

Combined Spatial and Temporal Dithering

FIG. 12 shows an example of a color gamut 1200 produced by a multi-primary display device in CIE Lab color space. The color gamut of various implementations of a multi-primary display device (for example, a display device including AIMOD 900) can be defined by a set of N selected primaries located in the CIE Lab color space. For the example illustrated in FIG. 12, 16 primaries are selected to form the color gamut. The selected 16 primaries are shown by squares in FIG. 12. As described in the previous section, different colors can be displayed by spatial dithering (e.g., vector screening or error diffusion). Displaying an input color by vector screening method includes determining a tetrahedron defined by four primary colors that includes the input color. For example, if the star 1202 in FIG. 12 represented the input color, then the tetrahedron 1205 defined by the four primary colors 1207a, 1207b, 1207c and 1207d is used displaying the input color using only on vector screening method. Since all the selected primary colors are located on the surface of the color gamut 1200, the selected four primaries 1207a, 1207b, 1207c and 1207d are separated by a large distance in the 3-D color space. A consequence of the large separation between the four primary colors 1207a, 1207b, 1207c and 1207d in the vector screening method is increased contrast difference between the four primary colors 1207a, 1207b, 1207c and 1207d which can result in more noticeable dither noise.

Significant reduction in visible dither noise can be obtained if the vector screening method is combined with temporal dithering. The reduction in visible dither noise can be attributed to an increase in the number of primary colors that are available for vector screening when temporal dithering is applied. For example, if vector screening is combined with 2× temporal dithering (e.g., temporal dithering with 2 sub-frames), then an additional 120 two-primary color combinations can be added to the original 16 primary colors that were available for vector screening. The additional two-primary color combinations are the average colors that are obtained by temporally blending two different primaries. In FIG. 12, some of the 120 two-primary combinations are shown by circles. As noted from FIG. 12, by employing 2× temporal dithering a smaller tetrahedron 1210 defined by four primary colors obtained by 2× temporal dithering that includes the input color 1202 can be found. The visible dither noise can be reduced since the distance between the four primary colors that define the smaller tetrahedron 1210 that includes the input color 1202 is reduced.

Temporally, the human visual system has limited sensitivity to detect fast-changing acts. Furthermore, the sensitivity of the human visual system can strongly depend on the contrast of the temporal changes. For example, consider two color patches, as shown in FIG. 13A that are displayed in alternate sub-frames (or frames) at a fast rate (e.g., at a rate greater than 60 Hz, at a rate of 120 Hz, at video rates, etc.). The human eye will perceive a blended color, as shown in FIG. 13B, without sensing any flicker. However, if the same two color patches are displayed in alternate sub-frames (or frames) at a slow rate (e.g., at a rate less than 60 Hz, at a rate of 30 Hz, etc.) then a human eye can be capable of perceiving a 30 Hz flicker. To reduce flicker, the display device or a portion thereof can be spatially partitioned using a checkerboard patterned screen such that some display elements are configured to display one of the two color patches shown in FIG. 13A and some other display are configured to display the other of the two color patches shown in FIG. 13A. FIG. 13C shows an implementation of a portion of a display device that is spatially partitioned using a checker board patterned screen. If the same two colors shown in FIG. 13A are combined by spatial dithering (e.g., vector screening or error-diffusion) and temporal dithering as shown in FIG. 13C, then the same blended color as shown in FIG. 13B can be perceived without sensing any flicker at lower speeds. The two dithered patches shown in FIG. 13C, include the same two colors shown in FIG. 13A but spatially distributed in a checkerboard pattern. Combined temporal and spatial color blending can be obtained by temporally alternating the two checkerboard patterned dithered patches shown in FIG. 13C in a video stream. The reduction in flicker can be attributed to a reduced contrast difference between the two temporal sub-frames (or frames).

Flicker in images rendered using combined spatial and temporal dithering can depend on various factors including but not limited to a contrast difference between different sub-frames (or frames) of temporal dithering, a distance between different primary colors selected for spatial/temporal dithering in the 3-D color space, the spatial arrangement of the different primary colors selected for spatial/temporal dithering in sub-frames (or frames) of temporal dithering, etc. For example, when the input color O is displayed by combined vector screening and temporal dithering, each vertex of the tetrahedron shown in FIG. 11A that includes the input color O is a combination of two primary colors of the multi-primary display device. This is shown in FIG. 14 which illustrates an example of representing an input color (O) by blending eight different primary colors associated with a multi-primary display device using vector screening method combined with temporal dithering. The tetrahedron 1400 including the input color O is defined by vertices (A1, A2), (B1, B2), (C1, C2) and (D1, D2), wherein A1, A2, B1, B2, C1, C2, D1 and D2 are different primary colors that can be displayed in different temporal sub-frames by the multi-primary display device. Although the order of each of the two primary color combination (e.g., (A1, A2) or (A2, A1)), does not affect the averaged color output of the two sub-frames, the spatial and temporal arrangement of the different primary colors can yield different spatio-temporal dither noise. This spatio-temporal dither noise can manifest itself as flicker in various implementations of a display device using 2× temporal dithering with two sub-frames operating at 60 Hz or less. Generally, the flicker is increased when all display elements of one temporal dithering sub-frame are configured to display the brighter primary color between the two primary colors of the selected primary combinations while all the display element of another temporal dithering sub-frame are configured to display the darker primary color between the two primary colors of the selected primary combinations. For example, with reference to FIG. 14, if primary color A1 is brighter than primary color A2; primary color B1 is brighter than primary color B2; primary color C1 is brighter than primary color primary color C2; and primary color D1 is brighter than primary color D2, then flicker that may be generated when all the display elements in one sub-frame of temporal dithering are configured to display the brighter primary colors A1, B1, C1 and D1 and all the display elements in another sub-frame of temporal dithering are configured to display darker primary color colors A2, B2, C2 and D2 can be greater than the flicker that may be generated when the brighter and the darker primary colors are distributed between the different sub-frames for temporal dithering.

The global flicker of a 2× temporal dithering can be greatly reduced by different spatial-temporal arrangement of selected primaries. For example, consider that the different primary colors are distributed spatially in each sub-frame of a 2× temporal dithering scheme using a checkerboard patterned spatial partition as shown in FIG. 13C. To reduce flicker, in a first sub-frame, the display elements configured to display the lighter primary color in FIG. 13C can be configured to display one of the brighter primary colors, A1, B1, C1 or D1, from chosen primary combinations, while the display elements configured to display the darker primary color in FIG. 13C can be configured to display one of the darker primary colors, A2, B2, C2 or D2. In the above example, the display elements that are configured to display the brighter primary colors in the first sub-frame can be configured to display the darker primary color (e.g., the corresponding darker primary color) in the second sub-frame and the display elements that are configured to display the darker primary colors in the first sub-frame can be configured to display the brighter primary color (e.g., the corresponding brighter primary color) in the second sub-frame.

In some implementations, local brightness differences may exist between different temporal sub-frames even if the brighter and the darker primary colors are spatially distributed between different sub-frames using a screen or a spatial partitioning scheme (e.g., a checkerboard patterned screen as discussed above, screens for generating a blue noise mask, other standard stochastic screens). Such local brightness differences can cause spotty flickers in temporal dithering, especially at a relatively lower frame rate, such as a frame rate less than or equal to 60 Hz. The occurrence of local brightness differences between different sub-frames of temporal dithering can be possibly attributed to "beating" between the screen or a spatial partitioning scheme (e.g., a checkerboard patterned screen as discussed above, screens for generating a blue noise mask, other standard stochastic screens) and the output of vector screening method. For example, the output of vector screening methods with 2× temporal dithering for each pixel is a two-primary combination, (A1, A2), (B1, B2), (C1, C2) or (D1, D2). Using a screen or a spatial partitioning scheme (e.g., a checkerboard patterned screen as discussed above, screens for generating a blue noise mask, other standard stochastic screens), the spatial distribution of each primary pair, say for example, (A1, A2), may form certain locally repeated patterns, such as for example, a checkerboard pattern. The locally repeated patterns can cause some of the primary pairs to be present in only one of the sub-frames and not in the other sub-frame. In such situations, if the brightness difference between a pair of primary colors that are present in only one sub-frame to be different from the brightness difference between other pairs of primary colors that are present only in the other sub-frame, "beating", or local flicker at a half of the frame rate, may be perceived.

In various implementations, the display device or a portion thereof can be spatially partitioned using other partitioning schemes instead of the 4×4 checkerboard pattern shown in FIG. 13C to reduce occurrence of local brightness difference in temporal dithering. For example, for 2× temporal dithering scheme including two temporal sub-frames, a possible spatial partitioning scheme can include even/odd 2×1 vertical or 1×2 horizontal line pattern that divides the display device or a portion thereof into two partitions. In such implementations, the beating between the spatial screen and the output of the vector screening may be reduced. In various implementations, the 4×4 checkerboard pattern partitioning scheme can be used for 4× temporal dithering (e.g., with 4 temporal sub-frames), while the even/odd 2×1 vertical or 1×2 horizontal line pattern partitioning scheme can be extended to K× (K>2) temporal dithering schemes, where K is the number of temporal sub-frames. For various implementations, if the movement of eye is synchronized with the frame rate, then the effects of temporal dithering may be cancelled. Accordingly, flicker in even/odd 2×1 vertical or 1×2 horizontal line pattern partitioning schemes may be worse when eye or image moves along certain directions. For example, if the eye or image moves along a direction that is perpendicular to the direction of the line pattern (e.g., horizontally for a 2×1 vertical pattern or vertically for a 1×2 horizontal pattern) or along a direction that is diagonal to the direction of the line patter, the flicker may be more visually perceptible. In such implementations, the color blending effect produced by the different sub-frames of temporal dithering might be cancelled by a quick eye or image movement in these directions, and the line structure of the partitioning could be appear as a transit flicker, which can be perceived globally on the entire output image. The flicker in such implementations can be noticeable, especially for temporal dithering including more than 2 sub-frames.

This disclosure contemplates a system and a method of displaying a desired color using temporal dithering in which a stochastic screen is used to determine the spatio-temporal distribution of different primary colors that produce the perception of a desired color by a human visual system (HVS). In contrast to other methods that use different dither screens or masks to determine the spatial arrangement of different primary colors in each temporal frame, the systems and methods contemplated herein use a single spatio-temporal dither screen to spatially distribute the different primary colors in different temporal frames. The stochastic screen is configured such that the visual appearance of the image produced by each temporal sub-frame is similar to an image produced by combining the different temporal sub-frames as well as the original image. This method of rendering a desired color can advantageously reduce flicker. The implementations of stochastic screens described herein can be used to display images using the methods and systems to process and display images as described above.

Temporal Dithering with Stochastic Screening

Various implementations of displaying an image on a display device that can produce multiple primary colors using temporal dithering with stochastic screening include dividing the display surface or a portion thereof of the display device into M partitions for a K× temporal dithering including K sub-frames. For example, for a 2× temporal dithering scheme, the display surface or a portion thereof can be divided into 2 partitions. The display surface of the display device or a portion thereof can correspond to the image plane. All the M partitions can have the same number of display elements but different stochastic spatial distribution. The colors output by the K different sub-frames are blended by temporal dithering to display the desired output color. The color displayed by a given display element which is a combination of M primary colors, the arrangement of the M primary colors in the K sub-frames depends on which partition the display element belongs to. For example, if a display element belongs to the partition P(0), the sequence of the M primary colors in the K sub-frames can be C(0), C(1), . . . , C(M−1), if a display element belongs to the partition P(1), the sequence of the M primary colors in the K sub-frames can be C(1), . . . , C(M−1), C(0), if a display element belongs to the partition P(M−1), the sequence of the M primary colors in the K sub-frames can be C(M−1), C(0), C(1) . . . , C(M−2) and so on.

An example of this approach is shown in FIG. 15 which illustrates an example of rendering a desired display color 1505 on a display device with twelve display elements using temporal dithering with stochastic screening method described above. The desired color 1505 can be represented by a combination of four primary colors C0 represented by 1501, C1 represented by 1502, C2 represented by 1503 and C4 represented by 1504. A stochastic screen including four partitions is generated and applied to the display device including the twelve display elements. The stochastic screen partitions the twelve display elements into four different partitions. In the illustrated example, display element 1510 belong to partition 1, display element 1512 belong to partition 2, display element 1514 belong to partition 3 and display element 1516 belong to partition 4. As discussed above, in the first temporal frame, display elements in partition 1 are configured to display primary color C0 represented by 1501; display elements in partition 2 are configured to display primary color C1 represented by 1502; display elements in partition 3 are configured to display primary color C2 represented by 1503; and display elements in partition 4 are configured to display primary color C3 represented by 1504. In the second temporal frame, display elements in partition 1 are configured to display primary color C1 represented by 1502; display elements in partition 2 are configured to display primary color C2 represented by 1503; display elements in partition 3 are configured to display primary color C3 represented by 1504; and display elements in partition 4 are configured to display primary color C0 represented by 1501. In the third temporal frame, display elements in partition 1 are configured to display primary color C2 represented by 1503; display elements in partition 2 are configured to display primary color C3 represented by 1504; display elements in partition 3 are configured to display primary color C0 represented by 1501; and display elements in partition 4 are configured to display primary color C1 represented by 1502. In the fourth temporal frame, display elements in partition 1 are configured to display primary color C3 represented by 1504; display elements in partition 2 are configured to display primary color C0 represented by 1501; display elements in partition 3 are configured to display primary color C1 represented by 1502; and display elements in partition 4 are configured to display primary color C2 represented by 1503. The stochastic screen which determines the plurality of partitions is configured such that the visual appearance of each temporal frame is similar to an image produced by combining the different temporal frames. It is noted that the same stochastic screen is applied to the display elements in each temporal frame.

Another example of the displaying an image using combined vector screening and temporal dithering based on partitioning the display surface or a portion thereof is explained with an example of 4× temporal dithering with four sub-frames at a frame rate greater than or equal to 120 Hz, and a 256-element stochastic screen arranged in 16 rows and 16 columns.

Figure 16:
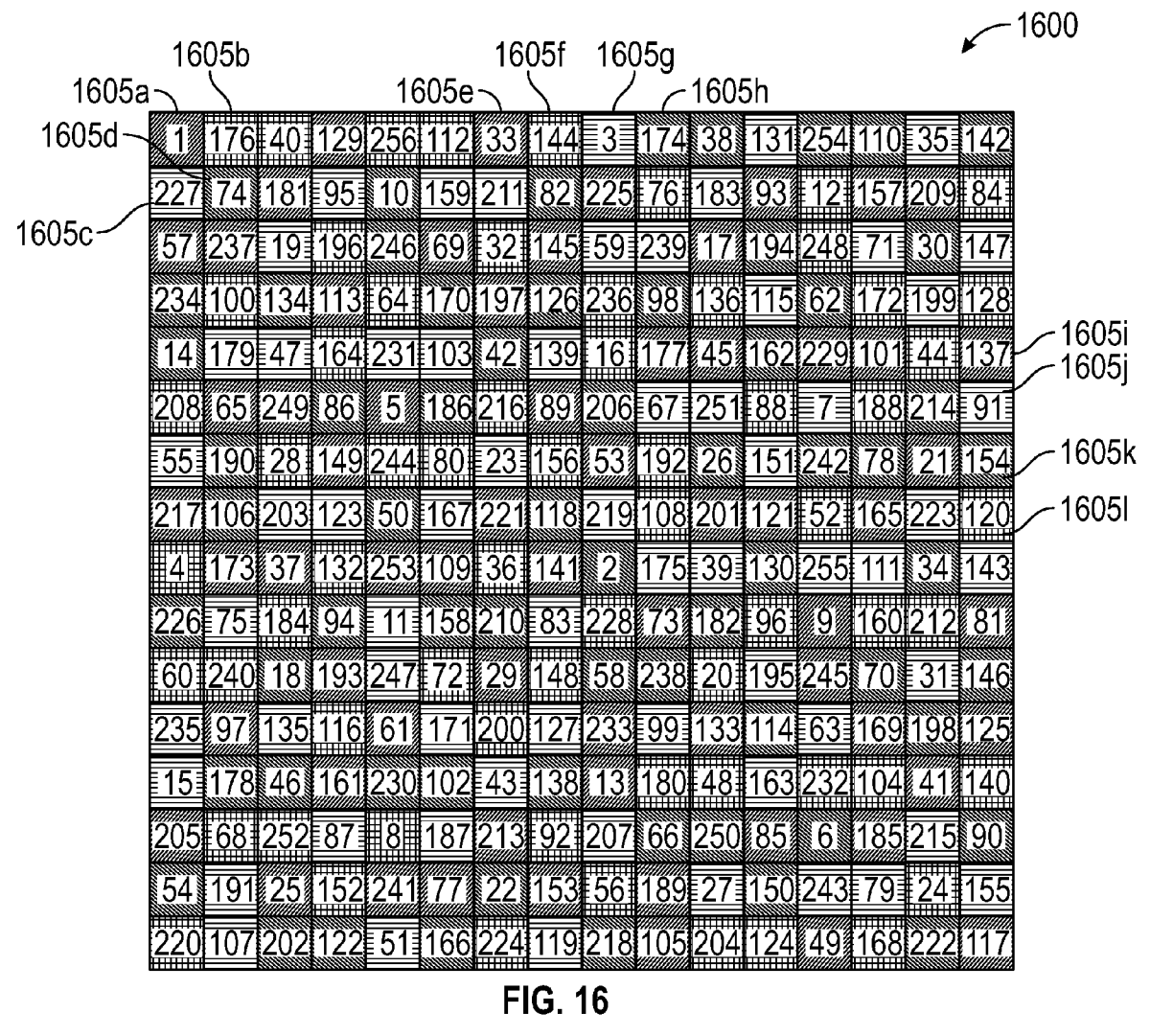

FIG. 16 illustrates an implementation of a 256-element stochastic screen 1600 that can be used to partition the display surface into four partitions. In FIG. 16, each screen element (e.g., 1605a, 1605b, 1605c, 1605d, 1605e, 1605f, 1605g and 1605h) belongs to one of four different partitions P(0), P(1), P(2) and P(3). Each partition is indicated by a different fill pattern or color. In the illustrated element, the different partitions are equal in size. However, in other implementations, the different partitions can have different sizes. The different partitions can be mutual exclusive such that there is no overlapping between the four partitions. When the screen 1600 is applied to a display device including a plurality of display elements, it can partition the plurality of display elements into four different mutually exclusive partitions. For example, the display device can be partitioned by the screen 1600 such that display elements corresponding to screen elements 1605a, 1605e and 1605i of the screen 1600 can be associated with a first partition P(0), display elements corresponding to screen elements 1605b, 1605f and 1605l can be associated with a second partition P(1), display elements corresponding to screen elements 1605c, 1605g and 1605j can be associated with a third partition P(2) and display elements corresponding to screen elements 1605d, 1605h and 1605k can be associated with a fourth partition P(4). In various implementations, only one display element can be associated with each screen element of the screen 1600. However, in other implementations, more than one display element can be associated with each screen element 1600. Each screen element of the screen 1600 is also associated with a number between 1 and 256 which correspond to the rank orders $r(x,y)$ of the 256 screen elements, where x and y are the spatial coordinates of the pixels. The rank orders correspond to the threshold values for the vector screening, as discussed above. The rank orders can also mathematically associated with the partitions, as shown by equation (10) below:

$$i = r(x,y) \% M, \qquad (10)$$

where i is the partition index, $r(x,y)$ is the rank order, M is the total number of partitions (which can also correspond to the total number of sub-frames), and % is the modulus operator. For example, i can have a value 0, 1, 2 or 3, for partitions P(0), P(1), P(2) and P(3) respectively and M can be 4 corresponding to four different partitions.

Associating the rank orders $r(x,y)$ and the partitions can be advantageous in ensuring that the rank orders associated with each partition are similar, or approximately the same for the purpose of temporal dithering, for all M partitions. Therefore, each partition contains exactly 1/M, or one fourth in the current example, of the dithering output of the entire image rendered by the combined vector screening and temporal dithering method, wherein the Kx temporal dithering generates a time sequence with K sub-frames, F(0), F(1), . . . , F(K−1) and the vector screening assigns a M primary color combination, C(0), C(1), . . . , C(M−1), for each display element. The primary colors displayed in each of the K sub-frames can be determined by equation (11) below:

$$k = (i+j) \% M, \qquad (11)$$

where i is the index of the M partitions P(i), j is the index of the K sub-frames F(j) and k is the index of the M primaries C(k).

Various implementations of stochastic screen that are currently used in various image processing methods are optimized by assigning the rank orders of display elements for best visual appearance of the dithering output. Although, the optimization process may be different in the different implementations of image processing methods, the quality of the image rendered by the different implementations can be similar. For example, the stochastic screens that are currently used to render images may be capable of generating images that have high quality at frame rates greater than or equal to 120 Hz, the image quality of each of the sub-frames of temporal dithering may be degraded or poor. For example, the difference between the different sub-frames of temporal dithering can contain some low spatial frequency components which can manifest as flicker noise when the frame rate is not much higher than 120 Hz (e.g., less than or equal to 120 Hz, less than or equal to 60 Hz, etc.).

The implementations of stochastic screen that are used by current image rendering methods are designed to optimize the visual appearance of the entire image without taking into consideration the appearance of individual sub-frames (or partitions). For example, the visual appearance of the image produced by the individual sub-frames (or partitions) using current image rendering methods that rely on stochastic screens need not resemble the visual appearance of the entire output image output. Instead, the difference between the entire output image and the image output by each sub-frame (or partition) can contain spatial low frequency components that can appear as noticeable dithering noise.

In contrast, the image rendering methods described herein rely on implementations of stochastic screens for temporal dithering that not only increase the image quality of the entire image output but also optimize the image quality produced by the different individual sub-frames such that differences between the different sub-frames and/or between the different sub-frames and the entire image do not include spatial low frequency components. Accordingly, the image produced by the image rendering methods described herein can reduce occurrence of flicker at lower frame rates (e.g., frame rates less than or equal to 120 Hz). Stated another way, the implementations of stochastic screens described herein are configured to reduce a brightness or a contrast difference between individual sub-frames of temporal dithering. Stated yet another way, the implementations of stochastic screens described herein are configured to distribute differences between individual sub-frames of temporal dithering and/or between the entire image and the different sub-frames of temporal dithering to spatial high frequency components.

Standard stochastic screens relied upon by current image rendering methods can be determined using a merit function Q. For example, the design of a stochastic screen S can be a mathematical optimization process, in which the single-valued merit function Q(S) is maximized. Examples of methods for generating stochastic screens are described in U.S. Pat. No. 6,014,500. The merit function Q can be modified as discussed below to determine various implementations of stochastic screens described herein that can reduce the appearance of flicker. Various implementations of stochastic screens disclosed herein can be considered to include M different stochastic screens for each of the M partitions (or K sub-frames of temporal dithering). Each of the M different stochastic screens can be considered as an optimized stochastic screen, while the entirety as the combination of the M partitions can also be optimized. Accordingly, to obtain implementations of stochastic screens that can reduce the appearance of flicker, the merit function Q is modified to a merit function by taking a weighted sum of M merit functions for the four partitions and a merit function for the whole screen. This is represented by equation (12), $$Q_{sum} = Q_{\Sigma P(i)} + w * \Sigma_{i=1}^{M} Q_{P(i)}. \qquad (12)$$

Merit functions can be represented by Gaussian functions, Butterworth functions, or other types of functions, for example, as described in U.S. Pat. No. 6,014,500. For example, a stochastic screen that is based on a blue noise mask can be designed using a merit function that measures or estimates how much low spatial frequency is filtered out.

In above equation (12), w is a weighting factor for balancing the dithered image quality of individual partition P(i) and the quality of the whole image. In various implementations, the weighting factor w can have a value 1/M. $Q_{P(i)}$ in equation (12) is the merit function that is used to obtain the stochastic screen which when applied to display elements belonging to the partition P(i) generates the image for the $i^{th}$ temporal sub-frame. $Q_{\Sigma P(i)}$ in equation (12) is the merit function that is used to obtain the stochastic screen for the entire temporal dithered image.

A single stochastic screen with M partitions is generated using the merit function described above such that the output rendered by the entire screen or any one partition has the desired stochastic distribution. The screen 1600 illustrated in FIG. 16 is determined using the modified merit function $Q_{sum}$ function given by equation (12) has 256 elements. The rank order for each screen element has a value between 1 and 256. Each of the 256 screen elements also belongs to one of four equal sized and mutually exclusive partitions. Accordingly, each partition has 64 screen elements. The rank orders of successive screen elements in each partition differ by 4. For example, if a first screen element in the first partition P(0) has a rank order 1 then the second screen element in the first partition P(0) has a rank order 5. As another example, if a first screen element in the second partition P(1) has a rank order 2 then the second screen element in the second partition P(0) has a rank order 6. Although, the screen 1600 illustrated in FIG. 16 has 256 screen elements, stochastic screen determined by using equation (12) can have more or less screen elements. For example, another implementation of a stochastic screen determined using equation (12) can have 384×384 screen elements. The number of screen elements can depend on the size of the display surface, display device and/or number of display elements. For example, stochastic screens determined to render images on display devices with smaller display surface or fewer display elements can have fewer screen elements than stochastic screens determined to render images on display devices with smaller display surface or fewer display elements. In various implementations, the number of screen elements can be equal to the number of display elements that are included in the display device on which image is rendered.

As discussed above, the image quality of the entire image generated by image processing methods described herein utilizing the stochastic screens determined by equation (12) above can be increased. Additionally, other than overall brightness, the visual appearance of images produced by each sub-frame (or partition) for temporal dithering can be similar to the entire output image. The differences between the individual sub-frames for temporal dithering (or partitions) are mostly in the "blue noise" region or spatial high frequency regions. Accordingly, using such sub-frames (or partitions) for temporal dithering, or primary cycling, can yield flicker-free temporal dithering output. Additionally, the differences between the individual sub-frames for temporal dithering (or partitions) can also be isotopically spread in all directions, which can make the temporally dithered output less sensitive to flicker.

The stochastic screens determined using the equation (12) can be used with existing and future image rendering methods. To use the stochastic screens determined using the equation (12) to render images, display devices can be configured to store the partition indices for individual display elements. The partition indices for individual display elements can be stored in a memory store associated with the display device. The size of the memory store can depend on the size of the stochastic screen and the number of partitions M or the number of sub-frames K for temporal dithering. As discussed above, the rank orders and the partition indices can be correlated with each other. Since the vector screening needs memory space to store the threshold values, which are derived from the rank orders of the various screen elements, in various implementations, it may be possible to store the thresholds and the partition indices together in a single memory store.

When the video input and the display device have the same frame rate, the temporal dithering may be implemented with neither input nor output frame buffer. For an example, a 2× temporal dithering process can be implemented for running both the input video and the display device at 60 Hz. For every input frame, the 2× temporal vector screening is conducted, the outputs for sub-frame one and two are alternatively selected for the output video sequence. Similar approach can be applied to 3× temporal dithering at 90 Hz or 4× temporal dithering at 120 Hz.

The stochastic screen determined by equation (12) can also be used in implementations of display devices described herein (e.g., an AIMOD display device) to switch easily from a first mode in which the image is displayed using temporal dithering to a second mode in which the image is displayed without temporal dithering. Implementations of display devices that do not use stochastic screens determined by equation (12) would have to re-render the image using only vector screening or error diffusion without temporal dithering when the display device is switched from the first mode to the second mode, since a simple pause of the temporal dithering would display the images produced by one of the sub-frames, which may not have an image quality that is acceptable. In contrast, display devices that utilize stochastic screens determined by equation (12) are configured such that the images produced by each of the sub-frames for temporal dithering have a certain minimum image quality that may be acceptable for an always-on display. Thus, the display device can be switched from a first mode in which the image is displayed using temporal dithering to a second mode in which the image is displayed without temporal dithering without re-rendering the image. In various implementations, the images produced by each of the sub-frames for temporal dithering can be saved in an output buffer. In various implementations of an AIMOD display device, the output buffer can be display device itself, if the charges on each of the display elements can be held for a long period.

Although, in the discussion above, the number of partitions of the stochastic screen were equal to the number of frames for temporal dithering, in other implementations, the stochastic screen determined by equation (12) can include more partitions than the number of sub-frames for temporal dithering. For example, a stochastic screen with M=12 partitions and determined using equation (12) above can be used with temporal dithering schemes having 2, 3, 4 or 6 sub-frames.

Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time. For example, in some implementations using a large number of primary colors (e.g., greater than 8 primary colors) and several temporal frames (e.g., greater than 3), the number of possible color combinations can be very large (e.g., hundreds, thousands, or more possible colors) and a physical computing device may be necessary to select the appropriate combinations of primary colors to be displayed from the large number of possible colors. Accordingly, various implementations of the methods described herein can be performed by a hardware processor included in the display device (for example, the processor 21, the driver controller 29, and/or the array driver 22 described below with reference to the display device of FIGS. 18A and 18B). To perform the methods described herein, the processor can execute a set of instructions stored in non-transitory computer storage. The processor can access a computer-readable medium that stores the indices for the plurality of partitions, the rank orders for the plurality of screen elements and threshold values that can be used to determine the assignment of different primary colors spatially in each temporal sub-frame. In various implementations, the computer-readable medium can also access indices of various primary colors and/or the last input image. A look-up table (LUT) can be used to store a correspondence between the display color and the set of primary colors. Various other implementations of the methods described herein can be performed by a hardware processor included in a computing device separate from the display device. In such implementations, the outputs of the methods can be stored in non-transitory computer storage and provided for use in a display device.

Figure 17:
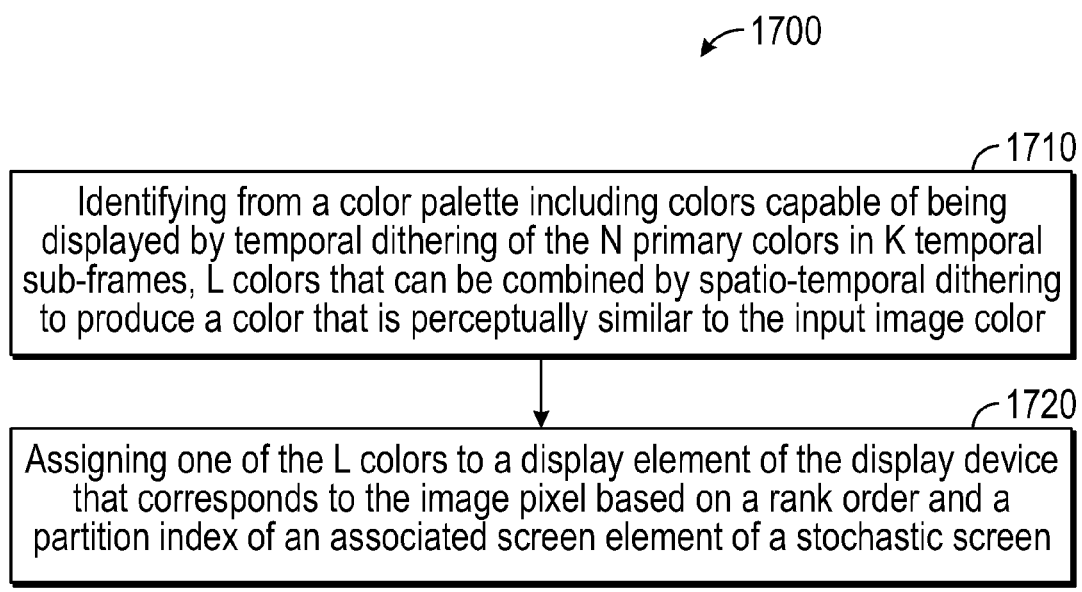
FIG. 17 is a flowchart that illustrates an example of a spatio-temporal vector screening method that can be used to display an input image including a plurality of image pixels on a display device having a plurality of display elements, each display element configured to display a plurality of colors in a color space associated with the display device.

FIG. 17 is a flowchart that illustrates an example of a spatio-temporal vector screening method 1700 that can be used to display an input image including a plurality of image pixels on a display device having a plurality of display elements, each display element configured to display a plurality of colors in a color space associated with the display device. In various implementations, the display element can be similar to the AIMOD 900 discussed above. Each of the plurality of image pixels can be associated with a color in the color space associated with the display device. As used herein, a color associated with each of the plurality of image pixels can include at least one of tone, grayscale, hue, chroma, saturation, brightness, lightness, luminance, correlated color temperature, dominant wavelength and/or a coordinate in the color space. In various implementations, the color associated with each of the plurality of image pixels can have a value between 0 and 255. The spatio-temporal vector screening method 1700 relies on partitioning the display device into a plurality of mutually exclusive partitions and generating a stochastic screen as discussed above for each of the plurality of partitions to determine the spatial and temporal arrangement of the primary colors selected to produce the desired color. The stochastic screens generated for each of the plurality of partitions P(i) are correlated with each other to reduce spatial low frequency noise and/or flicker.

For a given image pixel, the method 1700 includes identifying from a color palette including colors capable of being displayed by temporal dithering of the N primary colors in K temporal sub-frames, L colors that can be combined by spatio-temporal dithering to produce a color that is perceptually similar to the input image pixel color, as shown in block 1710. In various implementations, the identified L colors can form a polyhedron that includes the input image pixel color in a color space associated with the color palette. In various implementations, the polyhedron can be a tetrahedron.

For each of the K temporal sub-frames, the method 1700 further includes assigning one of the L colors to a display element of the display device that corresponds to the image pixel, wherein the assignment of one of the L colors to the display element in each of the K temporal sub-frames is based on a rank order and a partition index of an associated screen element of a stochastic screen, as shown in block 1720. The stochastic screen can associated with the display device or a portion thereof.

The stochastic screen can be similar to the various implementations of stochastic screens described herein. For example, the stochastic screen can be similar to screen 1600 illustrated in FIG. 16. The stochastic screen can be determined by equation (12) described above. The stochastic screen can be configured such that visual appearance of the image produced by each of the K temporal sub-frames is similar to an image produced by combining the K temporal sub-frames. As discussed above, the stochastic screen can include a plurality of partitions and the screen element can belong to one of the plurality of partitions. A number of the plurality of partitions can be greater than or equal to the number of temporal sub-frames. The plurality of partitions can be equal in size. The plurality of partitions can be mutually exclusive. Each of the plurality of partitions can include an equal number of screen elements. The stochastic screen can be configured to reduce a contrast difference between consecutive temporal sub-frames. The stochastic screen can be configured to distribute a color difference between images produced by each of the temporal sub-frames to spatial high frequency regions.

The method 1700 can be performed in its entirety by a physical computing device. The computing device can include a hardware processor and one or more buffers. A non-transitory computer readable storage medium can include instructions that can be executed by a processor in a physical computing device to perform the method 1700. In various implementations, the computing device and/or the non-transitory computer readable storage medium can be included with a system that includes a display device including a plurality of IMOD display elements including but not limited to implementations similar to AIMOD 900. For example, the processor 21 or the driver controller 29 of the display device 40 described with reference to FIG. 18A can perform the method 1700.

Figure 18A:
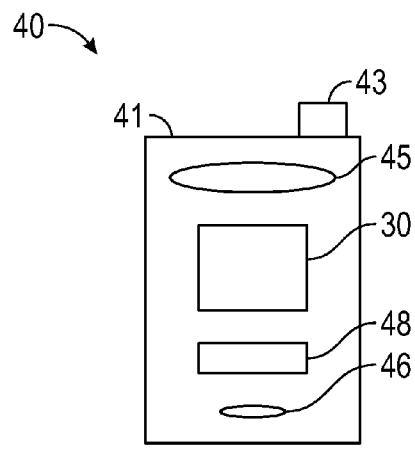
FIGS. 18A and 18B are system block diagrams illustrating a display device that includes a plurality of IMOD display elements.
Figure 18B:
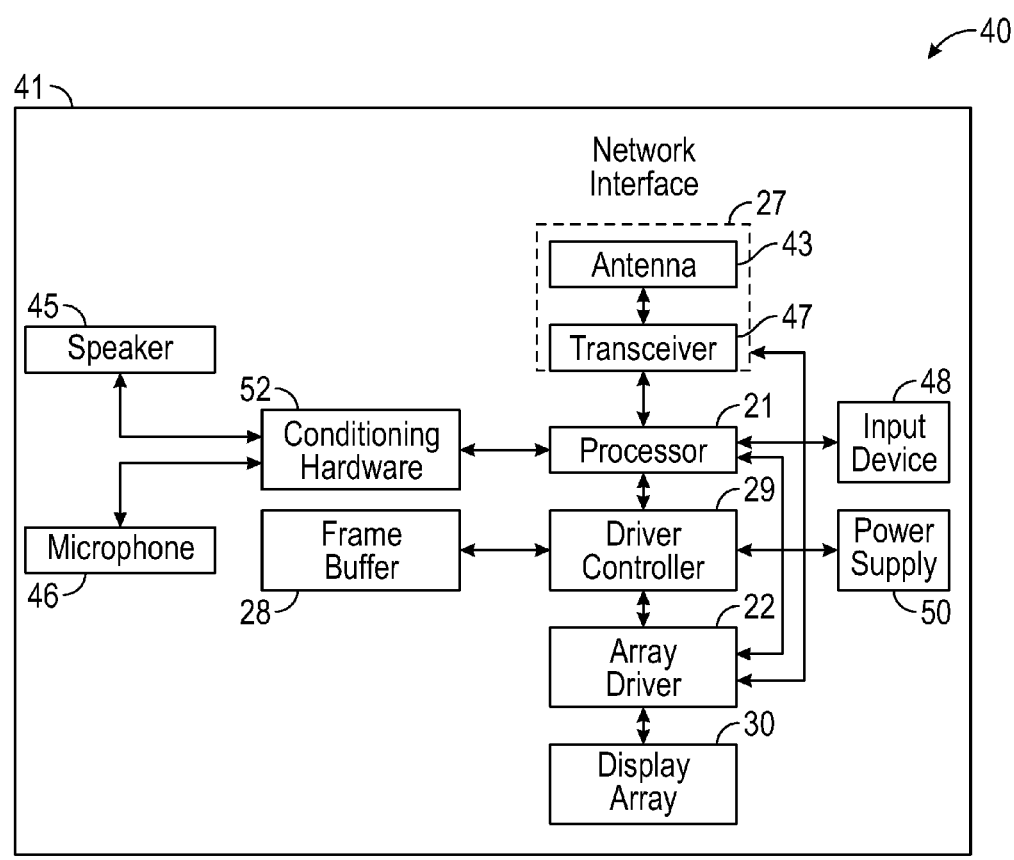

FIGS. 18A and 18B are system block diagrams illustrating a display device 40 that includes a plurality of IMOD display elements including but not limited to implementations similar to AIMOD 900. The display device 40 can be configured to use temporal (and/or spatial) modulations schemes that utilize the constrained color palette disclosed herein. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 18A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 18A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level. The processor 21 (or other computing hardware in the device 40) can be programmed to perform implementations of the methods described herein such as the methods 1000, and 1700. The processor 21 (or other computing hardware in the device 40) can be in communication with a computer-readable medium that includes instructions, that when executed by the processor 21, cause the processor 21 to perform implementations of the methods described herein such as the methods 1000 and 1700.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). The driver controller 29 and/or the array driver 22 can be an AIMOD controller or driver. In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described methods for generating a constrained color palette may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
a display device including a plurality of display elements, each display element capable of displaying N primary colors in a color space associated with the display device, wherein N is a positive number greater than 2; and
a computing device capable of communicating with the display device, the computing device capable of processing image data that includes a plurality of input colors for display by the display device, the image data including a plurality of image pixels with each image pixel associated with an input image pixel color, wherein the computing device is further capable of:
for a given image pixel:
identifying, from a color palette including colors capable of being displayed by temporal dithering of the N primary colors in K number of temporal sub-frames, L number of colors that can be combined by spatio-temporal dithering to produce a color that is perceptually similar to the input image pixel color, wherein K is a positive number greater than or equal to 2, and L is a positive number greater than 2;
associating a stochastic screen with the display device or a portion thereof, the stochastic screen including a plurality of screen elements belonging to one of M number of partitions and each of the plurality of screen elements associated with a corresponding display element of the display device, wherein M is a positive number greater than or equal to 2; and for each of the K number of temporal sub-frames,
assigning one of the L number of colors to a display element of the display device that corresponds to the image pixel, and
displaying an image produced by a respective one of the K number of temporal sub-frames,
wherein the assignment of one of the L number of colors to the display element in each of the K number of temporal sub-frames is based on a rank order and a partition index of a screen element of the stochastic screen that is associated with the display element,
wherein the stochastic screen is configured such that visual appearance of the image produced by each of the K number of temporal sub-frames is similar to an image produced by combining the K number of temporal sub-frames.

2. The apparatus of claim 1, wherein the stochastic screen includes at least 256 screen elements.

3. The apparatus of claim 1, wherein the stochastic screen includes a plurality of partitions P(i) and the screen element belongs to one of the plurality of partitions P(i).

4. The apparatus of claim 3, wherein the M number of the plurality of partitions is equal to the K number of temporal sub-frames.

5. The apparatus of claim 3, wherein the M number of the plurality of partitions is greater than the K number of temporal sub-frames.

6. The apparatus of claim 3, wherein the plurality of partitions are equal in size.

7. The apparatus of claim 3, wherein the plurality of partitions are mutually exclusive.

8. The apparatus of claim 3, wherein each of the plurality of partitions include an equal number of screen elements.

9. The apparatus of claim 3, wherein a difference in the rank order of two successive screen elements in one of the plurality of partitions is equal to a total number of the plurality of partitions.

10. The apparatus of claim 3, wherein the stochastic screen is determined by a merit function $Q_{sum}$ given by an equation: $Q_{sum} = Q_{\Sigma P(i)} + w^* \Sigma_{i=1}^{M} Q_{P(i)}$, wherein w is a weighting factor for balancing dithered image quality for each of the plurality of partitions P(i), M is the number of partitions, $Q_{P(i)}$ is a merit function that determines a stochastic screen which when applied to display elements in the partition P(i) generates an image to be displayed in the $i^{th}$ temporal sub-frame and $Q_{\Sigma(i)}$ is a merit function that determines a stochastic screen that generates the entire temporally dithered image.

11. The apparatus of claim 1, wherein the stochastic screen is configured to reduce a contrast difference between consecutive temporal sub-frames.

12. The apparatus of claim 1, wherein the stochastic screen is configured to distribute a color difference between images produced by each of the temporal sub-frames to spatial high frequency regions.

13. The apparatus of claim 1, further comprising a non-transitory memory device that is capable of communicating with the computing device, the non-transitory memory device configured to store the look-up table.

14. The apparatus of claim 1, wherein the display device is a reflective display device.

15. The apparatus of claim 1, wherein at least some of the plurality of display elements include a movable mirror.

16. The apparatus of claim 15, wherein each of the N primary colors corresponds to a distinct position of the movable mirror.

17. The apparatus of claim 1, further comprising a driver circuit capable of sending at least one signal to the display device.

18. The apparatus of claim 17, further comprising a controller capable of sending at least a portion of the image data to the driver circuit.

19. The apparatus of claim 1, further comprising an image source module capable of sending the image data to the processor.

20. The apparatus of claim 19, wherein the image source module includes at least one of a receiver, transceiver, and transmitter.

21. The apparatus of claim 1, further comprising an input device capable of receiving input data and to communicate the input data to the processor.

22. A computer-implemented method to display image data on a display device including a plurality of display elements, each display element capable of displaying N primary colors in a color space associated with the display device, wherein N is a positive number greater than 2, the image data including a plurality of input colors for display by the display device, the image data including a plurality of image pixels with each image pixel associated with an input image pixel color, the method comprising:
under control of a hardware computing device associated with the display device:
for a given image pixel:
identifying, from a color palette including colors capable of being displayed by temporal dithering of the N primary colors in K number of temporal sub-frames, L number of colors that can be combined by spatio-temporal dithering to produce a color that is perceptually similar to the input image pixel color, wherein K is a positive number greater than or equal to 2, and L is a positive number greater than 2;
associating a stochastic screen with the display device or a portion thereof, the stochastic screen including a plurality of screen elements belonging to one of M number of partitions and each of the plurality of screen elements associated with a corresponding display element of the display device, wherein M is a positive number greater than or equal to 2; and
for each of the K number of temporal sub-frames,
assigning one of the L number of colors to a display element of the display device that corresponds to the image pixel, and
displaying an image produced by a respective one of the K number of temporal sub-frames,
wherein the assignment of one of the L number of colors to the display element in each of the K number of temporal sub-frames is based on a rank order and a partition index of a screen element of the stochastic screen that is associated with the display element,
wherein the stochastic screen is configured such that visual appearance of the image produced by each of the K number of temporal sub-frames is similar to an image produced by combining the K number of temporal sub-frames.

23. The method of claim 22, wherein the stochastic screen includes a plurality of partitions P(i) and the screen element belongs to one of the plurality of partitions P(i).

24. A non-transitory computer storage medium comprising instructions that when executed by a hardware computing device associated with a display device processor cause the hardware computing device processor to perform a method for displaying image data on the display device including a plurality of display elements, each display element capable of displaying N primary colors in a color space associated with the display device, wherein N is a positive number greater than 2, the image data including a plurality of input colors for display by the display device, the image data including a plurality of image pixels with each image pixel associated with an input image pixel color, the method comprising:

for a given image pixel:
identifying, from a color palette including colors capable of being displayed by temporal dithering of the N primary colors in K number of temporal sub-frames, L number of colors that can be combined by spatio-temporal dithering to produce a color that is perceptually similar to the input image pixel color, wherein K is a positive number greater than or equal to 2, and L is a positive number greater than 2;

associating a stochastic screen with the display device or a portion thereof, the stochastic screen including a plurality of screen elements belonging to one of M number of partitions and each of the plurality of screen elements associated with a corresponding display element of the display device, wherein M is a positive number greater than or equal to 2; and for each of the K number of temporal sub-frames,
assigning one of the L number of colors to a display element of the display device that corresponds to the image pixel, and
displaying an image produced by a respective one of the K number of temporal sub-frames,
wherein the assignment of one of the L number of colors to the display element in each of the K number of temporal sub-frames is based on a rank order and a partition index of a screen element of the stochastic screen that is associated with the display element,
wherein the stochastic screen is configured such that visual appearance of the image produced by each of the K number of temporal sub-frames is similar to an image produced by combining the K number of temporal sub-frames.

25. The non-transitory computer storage medium of claim 24, wherein the stochastic screen includes a plurality of partitions $P(i)$ and the screen element belongs to one of the plurality of partitions $P(i)$.

* * * * *